US010942027B2

(12) United States Patent
Johnson et al.

(10) Patent No.: US 10,942,027 B2
(45) Date of Patent: Mar. 9, 2021

(54) VIDEO SENSOR FUSION AND MODEL BASED VIRTUAL AND AUGMENTED REALITY SYSTEMS AND METHODS

(71) Applicant: FLIR Belgium BVBA, Meer (BE)

(72) Inventors: Mark Johnson, Vannes (FR); Richard Jales, Eastleigh (GB); Gordon Pope, Hung Hom (HK); Christopher Gatland, Fareham (GB); Paul Stokes, Fleet (GB); Aaron Ridout, Chichester (GB); Chris Jones, Fareham (GB); Jay E. Robinson, Ventura, CA (US); Neil R. Owens, Winchester (GB); Peter Long, Fareham (GB)

(73) Assignee: FLIR Belgium BVBA, Meer (BE)

( * ) Notice: Subject to any disclaimer, the term of this patent is extended or adjusted under 35 U.S.C. 154(b) by 30 days.

(21) Appl. No.: 15/977,068

(22) Filed: May 11, 2018

(65) Prior Publication Data

US 2018/0259339 A1    Sep. 13, 2018

Related U.S. Application Data

(63) Continuation of application No. PCT/US2016/061727, filed on Nov. 12, 2016, which
(Continued)

(51) Int. Cl.
*G01C 21/00* (2006.01)
*G01C 21/20* (2006.01)
(Continued)

(52) U.S. Cl.
CPC ............ *G01C 21/005* (2013.01); *B63B 49/00* (2013.01); *G01C 21/203* (2013.01); *G01S 7/24* (2013.01);
(Continued)

(58) Field of Classification Search
CPC ........... G06K 9/00671; H04N 5/23258; H04N 5/23267; G01C 21/005; G01C 21/203;
(Continued)

(56) References Cited

U.S. PATENT DOCUMENTS 5,475,651 A    12/1995    Bishop et al.
6,163,337 A    12/2000    Azuma et al.
(Continued)

FOREIGN PATENT DOCUMENTS

CN       101782396       7/2010
GB         2525175      10/2015
WO    WO 2010/117278    10/2010

OTHER PUBLICATIONS

Almeida, Rob, "3D Recreation of Höegh Osaka's Intentional Grounding in the Solent," gCaptain, [retrieved on Oct. 19, 2018], 4 Pages [online]. Retrieved from the Internet: <https://gcaptain.com/3d-dynamic-replay-hoegh-osakas-grounding-solent/>.
(Continued)

*Primary Examiner* — Ke Xiao
*Assistant Examiner* — Andrew Shin
(74) *Attorney, Agent, or Firm* — Haynes and Boone, LLP

(57) ABSTRACT

Techniques are disclosed for systems and methods for video based sensor fusion with respect to mobile structures. A mobile structure may include at least one imaging module and multiple navigational sensors and/or receive navigational data from various sources. A navigational database may be generated that includes data from the imaging module, navigational sensors, and/or other sources. Aspects of the navigational database may then be used to generate an integrated model, forecast weather conditions, warn of dangers, identify hard to spot items, and generally aid in the navigation of the mobile structure.

18 Claims, 22 Drawing Sheets

Related U.S. Application Data is a continuation-in-part of application No. PCT/US2016/061722, filed on Nov. 12, 2016.

(60) Provisional application No. 62/255,291, filed on Nov. 13, 2015, provisional application No. 62/255,308, filed on Nov. 13, 2015.

(51) Int. Cl.

| | |
|---|---|
| G01S 15/93 | (2020.01) |
| G01S 13/86 | (2006.01) |
| G01S 15/87 | (2006.01) |
| G01S 7/24 | (2006.01) |
| G05D 1/06 | (2006.01) |
| H04N 5/232 | (2006.01) |
| G01S 7/62 | (2006.01) |
| G01S 13/937 | (2020.01) |
| G06T 7/50 | (2017.01) |
| G06T 7/70 | (2017.01) |
| G06K 9/00 | (2006.01) |
| G06T 3/20 | (2006.01) |
| G06T 3/40 | (2006.01) |
| G06T 3/60 | (2006.01) |
| G06T 7/20 | (2017.01) |
| G06T 11/60 | (2006.01) |
| B63B 49/00 | (2006.01) |
| G05D 1/02 | (2020.01) |

(52) U.S. Cl.
CPC .......... *G01S 7/629* (2013.01); *G01S 13/862* (2013.01); *G01S 13/937* (2020.01); *G01S 15/87* (2013.01); *G01S 15/874* (2013.01); *G01S 15/93* (2013.01); *G05D 1/0206* (2013.01); *G05D 1/0692* (2013.01); *G06K 9/00671* (2013.01); *G06T 3/20* (2013.01); *G06T 3/40* (2013.01); *G06T 3/60* (2013.01); *G06T 7/20* (2013.01); *G06T 7/50* (2017.01); *G06T 7/70* (2017.01); *G06T 11/60* (2013.01); *H04N 5/23258* (2013.01); *H04N 5/23267* (2013.01); *G06T 2207/10028* (2013.01); *G06T 2207/20212* (2013.01); *G06T 2207/30252* (2013.01); *G06T 2210/22* (2013.01)

(58) Field of Classification Search
CPC .... G06T 7/50; G06T 3/20; G06T 3/40; G06T 3/60; G06T 7/20; G06T 11/60; G06T 7/70; G06T 2207/10028; G06T 2207/20212; G06T 2207/30252; G06T 2210/22; B63B 49/00; G01S 7/24; G01S 7/629; G01S 13/862; G01S 13/9307; G01S 15/87; G01S 15/874; G01S 15/93; G01S 13/937; G05D 1/0206; G05D 1/0692

See application file for complete search history.

(56) References Cited

U.S. PATENT DOCUMENTS

| | | | |
|---|---|---|---|
| 6,191,808 | B1 | 2/2001 | Katayama et al. |
| 6,241,609 | B1 | 6/2001 | Rutgers |
| 6,323,895 | B1 | 11/2001 | Sata |
| 6,377,515 | B1 | 4/2002 | Healey |
| 6,449,215 | B1 | 9/2002 | Shell |
| 6,654,031 | B1 | 11/2003 | Ito et al. |
| 6,890,262 | B2 | 5/2005 | Oishi et al. |
| 6,917,370 | B2 | 7/2005 | Benton |
| 7,340,099 | B2 | 3/2008 | Zhang |
| 7,426,437 | B2 | 9/2008 | Breed et al. |
| 8,291,757 | B2 | 10/2012 | Johnson et al. |
| 2002/0071345 | A1 | 6/2002 | Chiang et al. |
| 2006/0244826 | A1 | 11/2006 | Chew |
| 2010/0157736 | A1 | 6/2010 | Riordan et al. |
| 2010/0198488 | A1 | 8/2010 | Groitzsch et al. |
| 2011/0004405 | A1* | 1/2011 | Hutchin ............... G01C 21/025 701/513 |
| 2012/0099400 | A1 | 4/2012 | Debrunner et al. |
| 2012/0320224 | A1 | 12/2012 | Miyoshi et al. |
| 2013/0127915 | A1* | 5/2013 | Gilra ........................ G09G 5/00 345/660 |
| 2014/0085533 | A1* | 3/2014 | Celia ........................ G03B 5/00 348/369 |
| 2014/0132707 | A1* | 5/2014 | Hashimoto ............... G01C 3/06 348/36 |
| 2014/0140609 | A1* | 5/2014 | Krishnaswamy ........ G06T 3/60 382/159 |
| 2014/0240500 | A1* | 8/2014 | Davies ...................... B60R 1/00 348/148 |
| 2014/0267686 | A1* | 9/2014 | Morin ...................... H04N 7/18 348/113 |
| 2015/0022678 | A1* | 1/2015 | Tsubaki ............. H04N 5/23254 348/208.5 |
| 2015/0358560 | A1 | 12/2015 | Boulanger et al. |
| 2016/0069681 | A1 | 3/2016 | Johnson et al. |
| 2016/0173850 | A1* | 6/2016 | Zhang .................. G09B 29/005 348/43 |
| 2016/0214534 | A1 | 7/2016 | Richards et al. |
| 2016/0300357 | A1* | 10/2016 | Boon ........................ G06T 7/11 |
| 2016/0370187 | A1 | 12/2016 | Gatland et al. |
| 2016/0378789 | A1* | 12/2016 | Hershey .................. G06F 16/29 707/772 |
| 2017/0176586 | A1 | 6/2017 | Johnson et al. |
| 2017/0184414 | A1 | 6/2017 | Johnson et al. |
| 2017/0277189 | A1 | 9/2017 | Johnson et al. |

OTHER PUBLICATIONS

Claxton, Tim, "Augmented Reality: New Features in Navigation Apps," boats.com, Nov. 13, 2014, [retrieved on May 14, 2015], 9 Pages [online]. Retrieved from the Internet: <https://www.boats.com/reviews/augmented-reality-new-features-navigation-apps/>.

Cooklev et al., "An Implementation of IEEE 1588 Over IEEE 802.11b for Synchronization of Wireless Local Area Network Nodes," IEEE Transactions on Instrumentation and Measurement, Oct. 2007, pp. 1632-1639, vol. 56, No. 5.

Hugues et al., "An Experimental Augmented Reality Platform for Assisted Maritime Navigation," Augmented Human Conference, Apr. 2-3, 2010, 6 Pages, Megeve, France.

Keefe, Joseph, "Futuristic Bridge Concept by Rolls-Royce," MarineLink, Feb. 25, 2015, [retrieved on Oct. 18, 2018], 9 Pages [online]. Retrieved from the Internet: <https://www.marinelink.com/news/futuristic-rollsroyce286595>.

Korneliussen et al., "Combining multibeam-sonar and multifrequency-echosounder data: examples of the analysis and imaging of large euphausiid schools," ICES Journal of Marine Science, Apr. 17, 2009, pp. 991-997, vol. 66, Oxford Journals.

Li et al., "The 3-D Map Building of AUV Based on D-S Information Fusion," Proceedings of the 33$^{rd}$ Chinese Control Conference, Jul. 28-30, 2014, pp. 8639-8644, Nanjing, China.

"Raymariner," MarineTraffic, [retrieved on Oct. 18, 2018], 7 Pages [online]. Retrieved from the Internet: <https://www.marinetraffic.com/en/ais/details/ships/shipid:193801/mmsi:235065795/imo:0/vessel:RAYMARINER>.

"Sensor fusion," Wikipedia, [retrieved on Oct. 18, 2018], 4 Pages [online]. Retrieved from the Internet: <https://en.wikipedia.org/wiki/Sensor_fusion>.

"What is a marine navigation software?" MaxSea, [retrieved on Oct. 18, 2018], 2 Pages [online]. Retrieved from the Internet: <http://www.maxsea.com/marine_navigation_software>.

Matthies et al., "Integration of Sonar and Stereo Range Data Using a Grid-Based Representation," Proceedings 1998 IEEE Interna-

(56) References Cited

OTHER PUBLICATIONS tional Conference on Robotics and Automation, Aug. 6, 2002, pp. 727-733, IEEE.

* cited by examiner

1000

1001

1010

1002

```
function [ I ] = RotateShift( I, roll, shift, param )
% Rotate and crop the image to stabilize for tilt and roll
% param.RollResize_factor: usually 1, allows for scaling at the same time
% param.cropH: how many horizontal pixels to crop
% param.cropV: how many vertical pixels to crop (usually more than H)
% param.pixelsH: how many horizontal pixels in total
% param.pixelsV: how many vertical pixels in total
rotation = affine2d([...
    cos(roll) sin(roll) 0;...
    -sin(roll) cos(roll) 0;...
    0 0 1]);
I = imwarp(I,rotation);
% tilt and crop the image
width = param.pixelsH - 2*param.cropH ;      %crop are border values, so final width is
original less borders left and right
height = param.pixelsV - 2*param.cropV ;     %crop are border values, so final width is
original less borders top and bottom
vstart = round((size(I,1)-height)/2+shift);
if vstart < 0
    newlines = zeros(-vstart, size(I,2),3,'uint8');
    I = vertcat(newlines, I);
    vstart=0;
elseif vstart + width - 1 > size(I,1)
    newlines = zeros(vstart + width - 1 - size(I,1), size(I,2),3,'uint8');
    I = vertcat(I, newlines);
end
I = imcrop(I,[(size(I,2)-width)/2+1 vstart+1 width-1 height-1]); %then translate
vertically and crop
end
```

FIG. 10F

VIDEO SENSOR FUSION AND MODEL BASED VIRTUAL AND AUGMENTED REALITY SYSTEMS AND METHODS

CROSS-REFERENCE TO RELATED APPLICATIONS

This application is a continuation of International Patent Application No. PCT/US2016/061727 filed Nov. 12, 2016 and entitled "VIDEO SENSOR FUSION AND MODEL BASED VIRTUAL AND AUGMENTED REALITY SYSTEMS AND METHODS," which is incorporated herein by reference in its entirety.

International Patent Application No. PCT/US2016/061727 filed Nov. 12, 2016 is a continuation-in-part of International Patent Application PCT/US2016/061722 filed Nov. 12, 2016 and entitled "SONAR SENSOR FUSION AND MODEL BASED VIRTUAL AND AUGMENTED REALITY SYSTEMS AND METHODS," which is hereby incorporated by reference in its entirety.

International Patent Application No. PCT/US2016/061727 filed Nov. 12, 2016 also claims priority to and the benefit of U.S. Provisional Patent Application No. 62/255,291 filed Nov. 13, 2015 and entitled "SENSOR FUSION AND MODEL BASED VIRTUAL AND AUGMENTED REALITY SYSTEMS AND METHODS," which is hereby incorporated by reference in its entirety.

International Patent Application No. PCT/US2016/061727 filed Nov. 12, 2016 also claims priority to and the benefit of U.S. Provisional Patent Application No. 62/255,308 filed Nov. 13, 2015 and entitled "COMBINING MULTIPLE NAVIGATIONAL DATA SOURCES SYSTEMS AND METHODS," which is hereby incorporated by reference in its entirety.

TECHNICAL FIELD

One or more embodiments of the invention relate generally to navigational systems and more particularly, for example, to systems and methods for navigational sensor fusion.

BACKGROUND

Navigational systems aid in the navigation of watercraft and other mobile structures. A mobile structure may include multiple navigational systems to aid in guiding the mobile structure. For example, a mobile structure may include radar, sonar, GNSS receivers, and other communications devices. Conventionally, these systems are separate from each other and do not intercommunicate as each system performs separate functions. For example, radar systems may be used to produce data showing the geometry of terrain or the presence of other objects/vehicles near a mobile structure. Sonar may be used to perform bathymetry, detect underwater hazards, find fish, and/or otherwise assist in navigation by producing data and/or imagery of a water column and/or a floor of a body of water beneath a watercraft. Each system typically includes its own display or display view to present data from the system, and each view is typically presented without reference to data from any of the other sensors. Thus, there is a need in the art for a methodology to combine navigational sensor data from disparate sensors to provide an intuitive, meaningful, and relatively full representation of the environment, particularly in the context of aiding in the navigation of a mobile structure.

SUMMARY

Techniques are disclosed for systems and methods to provide sensor fusion for mobile structures. In one embodiment, an apparatus may include a logic device configured to communicate with a plurality of navigational sensors and at least one orientation and/or position sensor (OPS), wherein each navigational sensor is configured to provide navigational data associated with a mobile structure. The logic device may be configured to receive the plurality of navigational data from the corresponding plurality of navigational sensors, receive, from the OPS, orientation and/or position data associated with at least one of the plurality of navigational data, and generate a navigational database by combining the plurality of navigational data based, at least in part, on the orientation and/or position data.

In another embodiment, a method may include receiving a plurality of navigational data from a corresponding plurality of navigational sensors, wherein each navigational sensor is configured to provide navigational data associated with a mobile structure; receiving, from at least one orientation and/or position sensor (OPS), orientation and/or position data associated with at least one of the plurality of navigational data; and generating a navigational database by combining the plurality of navigational data based, at least in part, on the orientation and/or position data.

In another embodiment, an apparatus includes a logic device configured to communicate with a plurality of navigational sensors, at least one orientation and/or position sensor (OPS), and an imaging module coupled to a mobile structure, wherein each navigational sensor is configured to provide navigational data associated with the mobile structure. The logic device may be configured to receive at least one image from the imaging module; receive orientation, position, and/or navigation data corresponding to the at least one image from the OPS and/or the plurality of navigational sensors; and generate at least one horizon-stabilized image corresponding to the received at least one image based, at least in part, on the received orientation, position, and/or navigation data and/or the received at least one image.

In another embodiment, a method includes receiving at least one image from an imaging module coupled to a mobile structure; receiving orientation, position, and/or navigation data corresponding to the at least one image from an orientation and/or position sensor (OPS) and/or a plurality of navigational sensors, wherein each navigational sensor is configured to provide navigational data associated with the mobile structure; and generating at least one horizon-stabilized image corresponding to the received at least one image based, at least in part, on the received orientation, position, and/or navigation data and/or the received at least one image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 10D-F illustrate pseudocode to generate a horizon-stabilized image for use in sensor fusion for navigational systems in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, sensor fusion navigational systems may be provided by various portable and/or fixed navigational sensors associated with a mobile structure or vehicle. The various navigational sensors may include imaging devices, sonar systems including one or more sonar transducer assemblies, radar systems, other ranging sensor systems, GNSS systems and/or other position sensors, orientation sensors, gyroscopes, accelerometers, position sensors, and/or speed sensors providing measurements of an orientation, a position, an acceleration, and/or a speed of the device, the sonar/radar/ranging sensor assemblies, and/or a coupled mobile structure, and/or other navigational sensors.

For example, the sensors may be mounted to or within the mobile structure (e.g., a watercraft, aircraft, motor vehicle, and/or other mobile structure), may be integrated with other sensor assemblies, or may be integrated within a portable device. Examples of portable devices include portable (global navigation satellite system (GNSS) devices, smartphones, tablets, portable computers, portable sensor suites, cameras, and other devices, Embodiments of the present disclosure provide sensor fusion that may combine sensor data from a plurality of sensors and present the sensor data according to a single reference frame, thereby providing enhanced data to a user that may also be more intuitive and easier to interpret than individually referenced data from each of the sensors. In certain embodiments, a 2D or 3D integrated model may also be rendered from the sensor data.

Figure 1A:
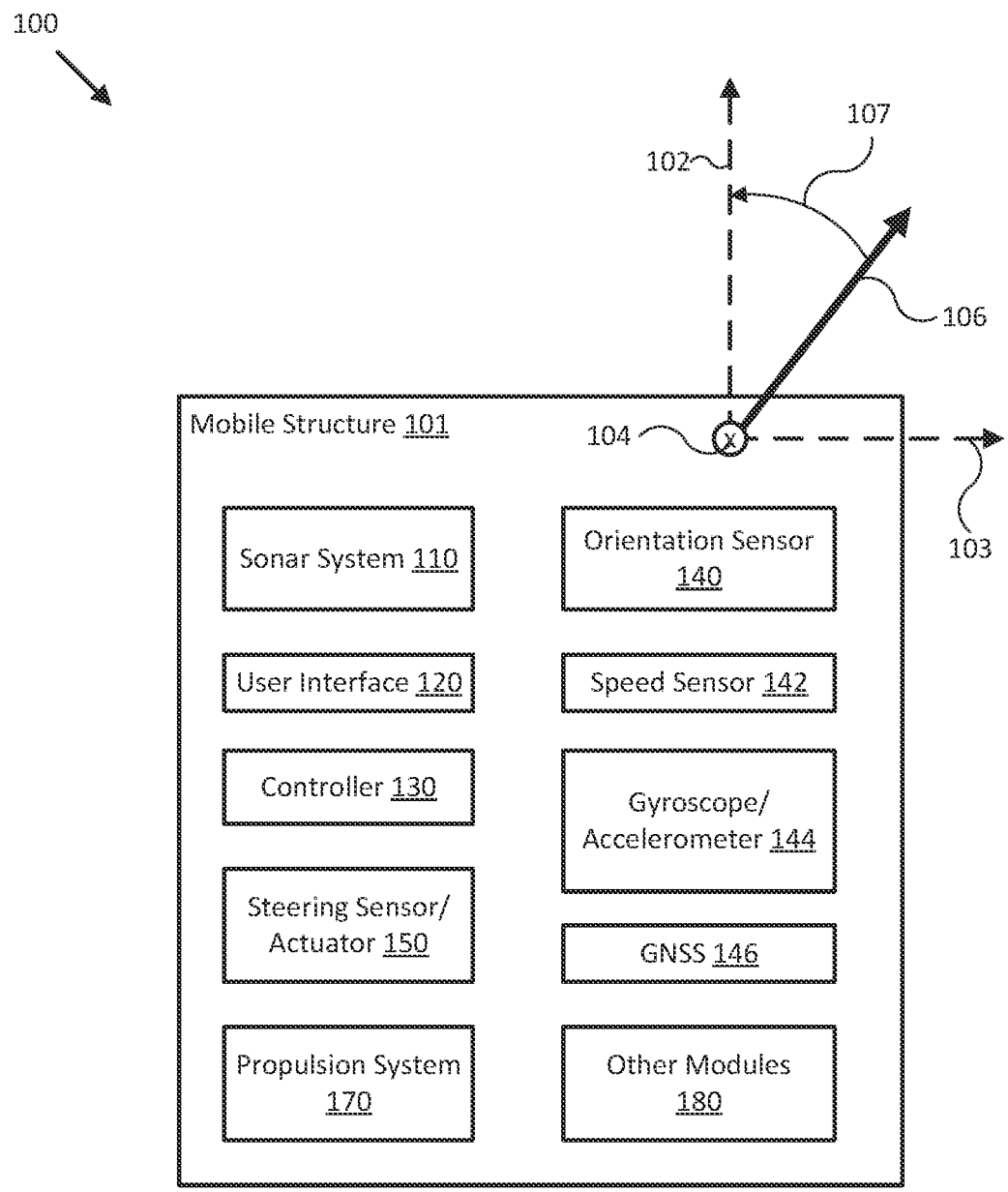
FIG. 1A illustrates a block diagram of a sensor fusion navigational system in accordance with an embodiment of the disclosure.

FIG. 1A illustrates a block diagram of a sensor fusion navigational system in accordance with an embodiment of the disclosure. In various embodiments, system 100 may be adapted to measure an orientation, a position, an acceleration, and/or a speed of mobile structure 101, and/or other elements of system 100. System 100 may include a plurality of navigational sensors that may produce navigational data. For example, such navigational sensors may include a sonar system 110, a steering sensor/actuator 150, an orientation sensor 140, a speed sensor 142, a gyroscope/accelerometer 144, a global navigation satellite system (GNSS) 146, and/or other modules 180 (i.e., a radar system, other ranging sensors, various environmental sensors, sensors directed towards the dynamic characteristics of the mobile structure, and/or other sensors). In certain embodiments, a plurality of certain types of the same sensor may be included within system 100.

System 100 may use these measurements to form various views of sensor data provided by various navigational sensors within system 100 and/or to adjust an orientation of one, some, or all of the navigational systems of system 100 according to a desired operation of elements of system 100 and/or mobile structure 101. In some embodiments, system 100 may display resulting sensor data and/or imagery to a user through user interface 120, and/or use the sensor data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sensor data and/or imagery for a particular type of mobile structure 101, such as a drone, a watercraft, an aircraft, a robot, a vehicle, and/or other types of mobile structures. In one embodiment, system 100 may include one or more of sonar system 110, user interface 120, controller 130, orientation sensor 140, speed sensor 142, gyroscope/accelerometer 144, GNSS 146, steering sensor/actuator 150, propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

In certain embodiments, orientation and/or position sensors (OPSs) may be included on mobile structure 101. The OPSs may be individually coupled to mobile structure 101 or may be contained within other modules and systems such as sonar system 110 and various imaging systems. The orientation and/or position sensors may detect the roll, pitch, and/or yaw of mobile structure 101 and output data related to the roll, pitch, and/or yaw to controller 130. Controller 130 may then utilize roll, pitch, and/or yaw to correct data obtained by various sensors and systems coupled to mobile structure 101 (e.g., sonar, radar, and/or other ranging sensor systems, and/or other sensors). For example, sonar data of a seafloor may be significantly affected by roll, pitch, and/or yaw of a mobile structure because emitted sonar pulses may then travel to the ocean floor at an angle, which can significantly increase the detected distance. Using data related to corresponding angles of roll, pitch, and/or yaw, controller 130 may then correct or otherwise adjust such erroneous readings.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality underwater views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such an embodiment, controller 130 may be configured to control the actuators associated with the transducer assembly to maintain its orientation relative to, for example, mobile structure 101 and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110. Still other embodiments may not include the sonar system 110, but may include other sensor assemblies and other components.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals. Additionally, user interface 120 may also be adapted to display a 2D or 3D integrated model that may combine sensor data from a plurality of sensors.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of mobile structure 101 and/or various elements of system 100.

Orientation sensor 140 may be implemented as one or more of a compass, float, accelerometer, magnetometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented according to any global navigation satellite system (GNSS), including a GPS, GLONASS, and/or Galileo based receiver and/or other device capable of determining absolute and/or relative position of mobile structure 101 (e.g., or an element of mobile structure 101 and/or system 100, such as sonar system 110 and/or user interface 120) based on wireless signals received from space-born and/or terrestrial sources (e.g., eLoran, and/or other at least partially terrestrial systems), for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/ port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, LIDAR systems, a salinity sensor such as a sea surface salinity sensor, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared and/or visible light illuminators, infrared and/or visible light cameras, radars, sonars, LIDAR systems, and/or other actuated devices) coupled to mobile structure 101, where each actuated device includes one or more actuators adapted to adjust an orientation of the device, relative to mobile structure 101, in response to one or more control signals (e.g., provided by controller 130). Additionally, other modules 180 may also include orientation and/or position sensors associated with sensors of the other modules 180. The orientation and/or position sensors may be incorporated within the sensors of the other modules 180, or may be separate from the sensors of the other modules 180.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
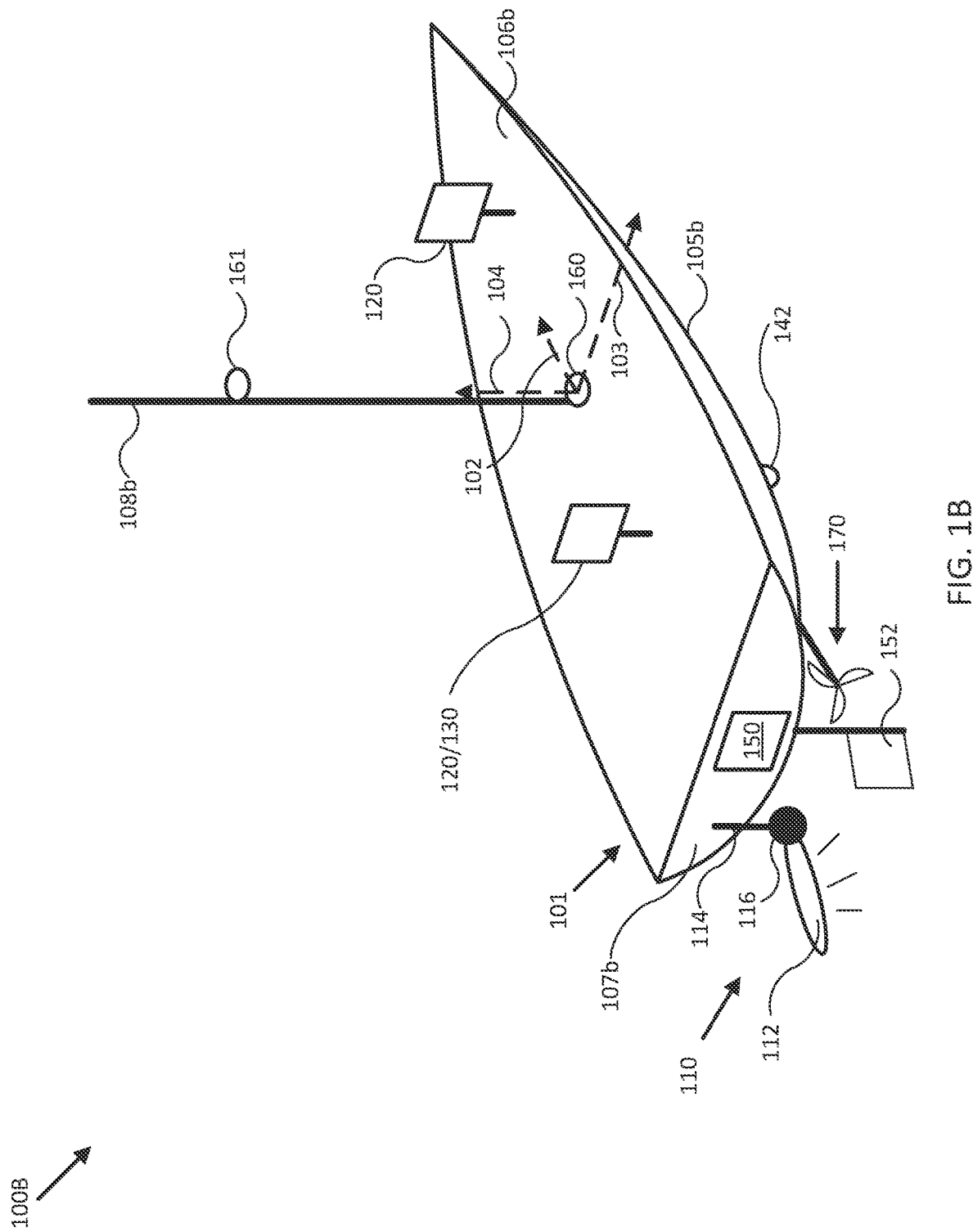
FIG. 1B illustrates a diagram of a mobile structure with a sensor fusion navigational system in accordance with an embodiment of the disclosure.

FIG. 1B illustrates a diagram of a mobile structure with a sensor fusion navigational system in accordance with an embodiment of the disclosure. In the embodiment shown in FIG. 1B, system 100B may be implemented to provide navigational data, such as an integrated model or some data outputs to the user, for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, GNSS 146, and/or other modules 180 such as radar systems), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar orientation and/or position sensor (OPS), which may include one or more sensors corresponding to orientation sensor 140, gyroscope/accelerometer 144 and/or GNSS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. Other embodiments of the user interface 120 may include a portable device that is not physically coupled to the user and/or mobile structure 101. In various embodiments, user interface 120 may be implemented with a relatively thin display that is integrated into a PCB or other electronics of the corresponding device or structure in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
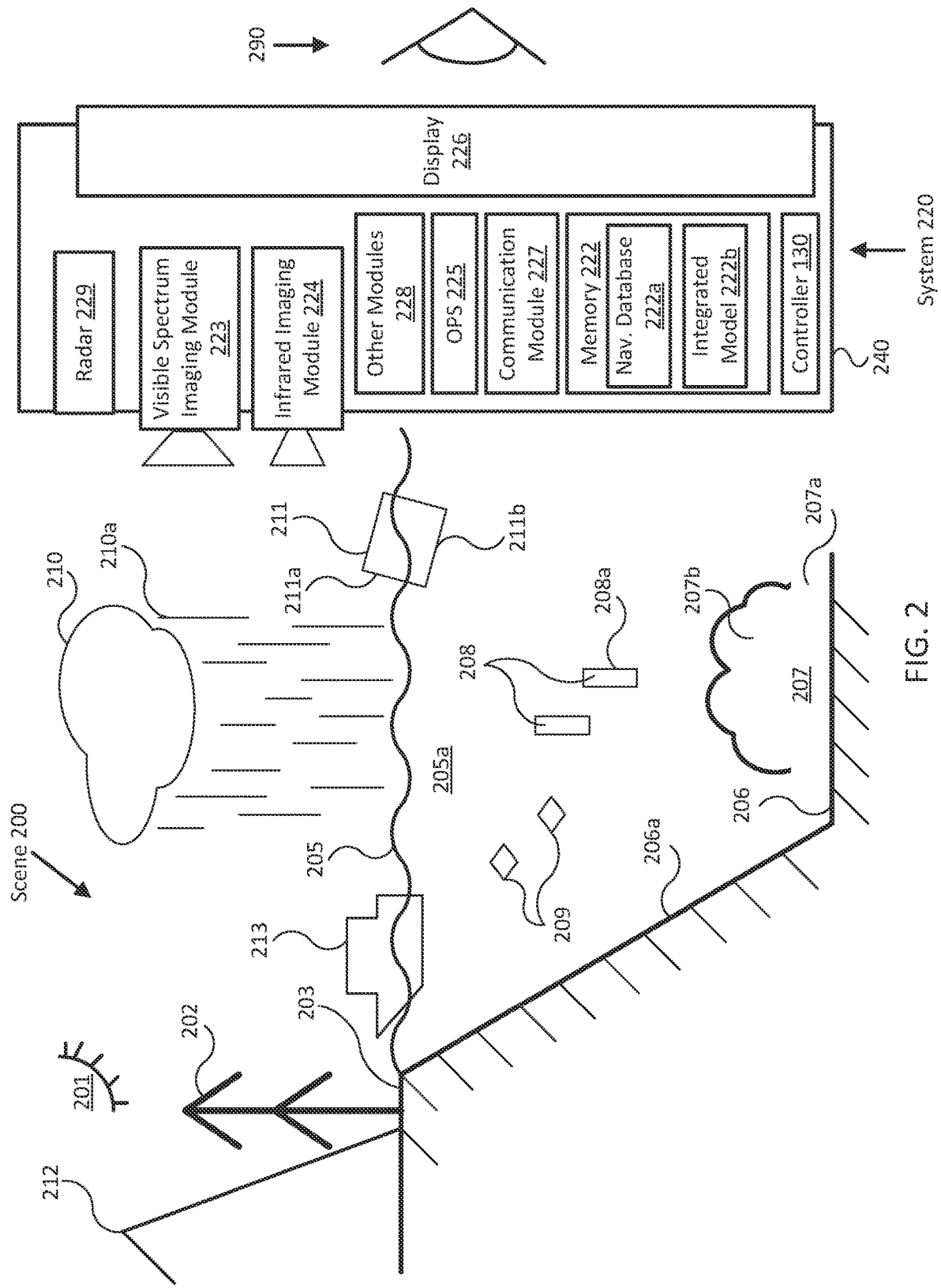
FIG. 2 illustrates a diagram of a sensor fusion navigational system in accordance with an embodiment of the disclosure.

FIG. 2 illustrates a diagram of a sensor fusion navigational system in accordance with an embodiment of the disclosure. In various embodiments, system 220 may be implemented with similar functionality as that described with reference to user interface 120 and/or controller 130 in FIGS. 1A and 1B. In the embodiment shown in FIG. 2, system 220 may be configured to provide visible spectrum imagery (e.g., using a visible spectrum imaging module 223), infrared spectrum imagery (using infrared imaging module 224), sonar imagery (using sonar system 110 of FIGS. 1A and 1B), and/or radar imagery (using radar system 229) of scene 200 to a user 290 viewing a display 226. For example, system 220 may be configured to display rendered image data (e.g., provided by imaging modules 223 and/or 224) and/or radar data in a portion of a field of view (FOV) of display 226 that is above waterline 205 and to display rendered sonar data in a portion of the FOV that is below waterline 205.

Image data provided by imaging modules 223 and/or 224 as well as radar data provided by radar 229 may include an image of a surface of a body of water 205a and various objects or structures above waterline 205, such as the sun 201, a tree 202, a beach 203, a hill 212, cloud 210, rain 210a, floating object 211 or floating object 211a (the part of the floating object 211 above the waterline), and/or vehicle 213. Such image data may be processed using feature/pattern recognition techniques to determine a location of waterline 205 within the image data (e.g., if imaging modules 223 and/or 224 are oriented to capture a portion of scene 200 including waterline 205). Sonar data, which may be provided by bathymetric charts and/or past or current use of sonar system 110 of FIGS. 1A and 1B, may include data representative of waterline 205, a floor 206 of body of water 205a, a bank 206a of floor 206, a bottom feature 207 (e.g., a rock or sunken ship), fish 208 (or other fish, game, wildlife, and/or other flora and fauna), other submerged objects 209 (e.g., trash, seaweed), floating object 211b (the part of the floating object 211 below the waterline), and/or other underwater features within or surrounding body of water 205a.

A sea state of the body of water 205a may also be determined using data from data including image data. For example, as shown in FIG. 2, waterline 205 may be choppy. Analysis of the visual and/or thermal imaging data from the visible imaging module 223 and/or the infrared imaging module 224 may determine the choppiness of waterline 205 and, thus, determine at least a portion of the sea state of body of water 205a. In certain embodiments, such a sea state (e.g., sea calmness or choppiness) may be rendered or communicated within an integrated model by, for example, graphical representations (e.g., animating the sea state in a 2D or 3D manner or through representations of the sea state using sea state indicators) or textual representations (e.g., text describing the sea state or rating the sea state according to a sea state scale such as a numerical scale).

Data from the modules within system 220 or system 100 may be combined within a navigational database. The navigational database may, for example, be contained within memory 222 (e.g., navigational database 222*a* within memory 222) and may be communicatively connected to other components within system 100 and/or the system 220. Navigational database 222*a* may receive data from one or both of system 100 or system 220. Additionally, navigational database 222*a* may receive data from other modules, sensors, imaging systems, or devices that may or may not be coupled with mobile structure 101. For example, navigational database 222*a* may receive data from a smartphone of a user, from other vehicles, from GNSS satellites, from fixed devices such as traffic control services, from other communications systems such as radios and laser communications, and from cloud based interior database. In certain such embodiments, communication module 227 may transmit and/or receive navigational database 222*a*. Communication module 227 may be stabilized and may utilize orientation and/or position data to stabilize communication module 227 to better transfer and/or receive data. Such stabilization may reduce bandwidth requirements of a network.

For the purposes of this disclosure, any and all data that may directly or indirectly aid in the navigation of a vehicle may be considered navigational data. Also, the navigational database may combine navigational data of navigational sensors from any or all appropriate sources. The navigational database may also include orientation and/or position data from and/or associated with the navigational sensors. In certain embodiments, the navigational database may receive data from other sensors via communication module 227.

Navigational database 222*a* may, in certain embodiments, be used to aid in navigation of mobile structure 101 by fusing together data from a plurality of sensors. The data may be fused in a manner to aid in the navigation of mobile structure 101 or assist in the presentation of the data to an operator of mobile structure 101 or a user of a display in a manner that may make the presentation easier to understand, more complete, and/or more informative. In certain embodiments, an operator may be a person in operational control of mobile structure 101, while a user may be a person in control of an electronic device that may contain the display. The operator and/or the user may be the same person or may be different people.

For example, navigational database 222*a* may include data from sonar system 110, visible spectrum imaging module 223, infrared imaging module 224, radar 229, and/or other navigation sensors of system 220. Controller 130 may be configured to generate an integrated model (e.g., integrated model 222*b*) from at least some of the data within navigational database 222*a*. Integrated model 222*b* may be, for example, a 2D or 3D representation of an environment near mobile structure 101. Integrated model 222*b* may present the environment from substantially the point of view of the viewer of the vehicle (e.g., from the point of view of a bridge of a watercraft or from the point of view of where an imaging sensor may be located), from a top down point of view, from a perspective or angled view, or from a free-form view (i.e., where a user may select a viewpoint).

In certain embodiments, the integrated model 222*b* may combine data from multiple sensors, such as, for example, data from sonar system 110, visible spectrum imaging module 223, infrared imaging module 224, and/or radar 229. Integrated model 222*b* may combine data from multiple sensors into one view. Integrated model 222*b* may comprise a rendering of a virtual representation of the environment (e.g., render the environment from scratch, such as with a full 3D model) or may use data from one or more sensors as a base view and render additional data "on top" of the base view, such as in an overlay with variable transparency, for instance.

For example, data from visible spectrum imaging module 223 may be selected for the base view and data from infrared imaging module 224, sonar system 110, and/or radar 229 may be rendered "on top" of the base view. Accordingly, using the example of the scene 200 in FIG. 2, the base view may be a visual view from visible spectrum imaging module 223. Due to rain 210*a*, visible spectrum imaging module 223 may not be able to detect vehicle 213 behind rain 210*a*. However, radar 229 and/or infrared imaging module 224 may be able to detect vehicle 213 through rain 210*a*. Thus, in a certain embodiment of the integrated model, the radar image and/or the thermal image of vehicle 213 may be included in the view of the visible image from visible spectrum imaging module 223. Thus, the integrated model may, in addition to displaying data from visible spectrum imaging module 223, also overlay radar and/or thermal image of vehicle 213 within the integrated model. Accordingly, an operator/user may be aware of the presence of vehicle 213 even though vehicle 213 may not be visible in the visual spectrum.

Additionally or alternatively, features detected by sonar system 110 may also be incorporated into the integrated model. For example, sonar system 110 may detect and/or output data representative of waterline 205, floor 206 of body of water 205*a*, bank 206*a* of floor 206, bottom feature 207 (e.g., a rock or sunken ship), fish 208, other submerged objects 209 (e.g., trash, seaweed), floating object 211*b*, and/or other underwater features within or surrounding body of water 205*a*. Such underwater features may be rendered within the integrated model. Such underwater features may be indicated and/or differentiated within the integrated model from, for example, features above the water line through use of any combination of contour lines, color and/or greyscale mapping and/or shading, three dimensional rendering, and/or other volumetric rendering techniques. In some embodiments, surface orientations of various underwater features (e.g., of side 207*a* or top 207*b* of bottom feature 207, or of side 208*a* of fish 208) may be detected and/or differentiated using similar sonar data and/or image processing techniques.

In various embodiments, integrated model 222*b* may be generated from the navigational database 222*a* and shown on display 226. The portions of any of image data from visible spectrum imaging module 223 and infrared imaging module 224, sonar data from sonar system 110, radar data from radar 229, GNSS data from the GNSS 146, and other data from other navigational sensors that are rendered and displayed by display 226, and the techniques used to render the imagery, may be selected based on a point of view of display 226 to provide a view fusing the data of multiple navigational sensors.

Such fusing may be demonstrated in an example where the position of mobile structure 101 is determined. In certain embodiments, the resolution of GNSS data may result in positional errors of multiple feet. Additionally, connection to various GNSS satellites may be periodically lost and GNSS 146 may be miscalibrated or otherwise inaccurate. In such instances, system 100 and/or 220 may utilize data from other sensors to complement or supplement the GNSS data. For example, image data, sonar data, and/or radar data may be used to help determine the position of mobile structure 101.

Such data may allow controller 221 to analyze the data and determine the position of mobile structure 101 according to the data.

For example, controller 221 may roughly determine the position of mobile structure 101 from current or outdated GNSS data, determine landmarks in the environment around mobile structure 101, and then may use image, sonar, and/or radar data to locate such landmarks within the data. Controller 221 may then determine the distance from mobile structure 101 to one or more such landmarks and, thus, determine the location of mobile structure 101. In certain such embodiments using image data, there may be a plurality of visual and/or thermal imaging modules 223 and/or 224. The plurality of imaging modules may be configured to allow the controller to determine a distance of mobile structure 101 to the landmark imaged. In such embodiments, visual and/or thermal imaging modules 223 and/or 224 may additionally include corresponding OPSs. The orientation and/or position data from the OPSs may also aid in determining the position of mobile structure 101.

In a further embodiment, the position of mobile structure 101 may be determined from both the GNSS data and other data (e.g., the controller may determine a first position of mobile structure 101 from the GNSS data and may independently determine a second position of mobile structure 101 from other data). The GNSS data may then be aligned with other data to generate an integrated model. Aligning may associate an aspect of the GNSS data to an aspect of another navigational data. Aligning may include, for example, determining a global position of a detected terrain feature (e.g., an underwater ridge detected by sonar may be determined to be positioned in an area indicated by GNSS to include an underwater ridge), combining GNSS data with detected weather conditions (to determine the position of the weather condition), and/or other techniques that may combine GNSS data with other navigational data to increase the accuracy of the navigational data, better present the data to a user, and/or other improvements.

Additionally, in certain embodiments, a position determined from the GNSS data may then be compared to the position determined from the other sensors and any mismatches may be highlighted in the rendering of the integrated model. In certain embodiments, controller 130 may also include algorithms to, if a mismatch is detected, render the integrated model according to data from a preferred sensor or module (e.g., render the integrated model according to one of GNSS data, visual image data, thermal image data, radar data, or sonar data). Also, the controller may, if the first position and second position are determined to substantially match (e.g., if terrain features are within, for example, +/−25 feet of their positions measured using the different sensors) the controller may indicate that the first position and the second position are matching. In other embodiments, controller 130 may compare data of other sensors related to other aspects of the database and/or the integrated model and determine any matches or mismatches within the data of navigational database 222a. The matches and/or mismatches may be directed to any aspect of navigational database 222a or integrated model 222b. For example, matches and/or mismatches between terrain features, wildlife (e.g., flora and/or fauna), mobile structure position, environmental conditions, and/or other aspects of data within navigational database 222a may be highlighted. The matches and/or mismatches may then be highlighted within display 226, such as through renderings within the integrated model.

Additionally, in another embodiment, the position of mobile structure 101 may first be determined, and, using radar, sonar, image, and/or other data, positions of other vehicles and/or landmarks may be determined. Thus, in such embodiments, the position of mobile structure 101 may first be determined. Then, the various sensors on mobile structure 101 may receive data associated with the position of the other vehicles, or data may be sent to mobile structure 101 from the other vehicles or third party data related to such may be sent to mobile structure 101. For example, the visible and/or infrared imaging module 223 and/or 224 may, through image data, determine a distance of the vehicle from mobile structure 101. Another module and/or the OPS may then determine the direction that the visible and/or infrared imaging module 223 and/or 224 is pointed towards and, accordingly, determine where, in relation to mobile structure 101, the vehicle is located. Thus, the position of the other vehicle may then be determined.

As shown, system 220 may include one or more controllers 221 (e.g., including memory 222), imaging modules (e.g., visible spectrum imaging module 223 and/or infrared imaging module 224), other sensors (e.g., orientation and/or position sensor 225), display 226, communication module 227, and/or other modules 228 facilitating operation of system 220, which may or may not all be disposed within a common housing 240. In certain embodiments, system 220 may be a portable device or may be integrated within a mobile structure. In other embodiments, the components of system 220 may be distributed over a combination of one or more portable devices, mobile structure 101, and/or external devices, structures, and vehicles. In certain embodiments, one or more of the modules shown in FIG. 2 may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communication module 227.

Visible spectrum imaging module 223 and infrared imaging module 224 may be electronic devices configured to capture imagery/image data of scene 200 according to their respective spectrums and provide images/image data to controller 221 and/or memory 222. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by system 220 and/or displayed using display 226 using any of the methods described in U.S. patent application Ser. No. 14/138,058 (incorporated by reference above) and/or as further described herein.

More generally, system 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from system 220 (e.g., to deck 106b or mast/sensor mount 108b of mobile structure 101 in FIG. 1B, using a fixed or actuated mounts such as imager cluster 161) and be configured to provide imagery to controller 221 using wired and/or wireless communications through communication module 227. In such embodiments, multiple devices may be configured to share image data provided by imaging modules mounted to mobile structure 101.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In certain embodiments, controller 221 of system 220 may be integrated or may be the same as controller 130 and, thus, may be integrated within mobile structure 101. In other embodiments, system 220 or part of system 220 may be separate from mobile structure 101 and, accordingly, controller 221 and controller 130 may be separate. In such embodiments, controller 221 and controller 130 may be communicatively coupled through, for example, WiFi, Bluetooth, direct data links, NFC, and other appropriate communication data methods. In some embodiments, controller 221 may be in communication with various modules of system 220 and be configured to receive imagery/image data of scene 200 from imaging modules 223 and/or 224, determine waterline 205 of a body of water 205a in scene 200 (e.g., from image data, position data, and/or orientation data provided by the device), render or display image data in any portion of an FOV of display 226 that extends above waterline 205, and/or render and/or display sonar data in any portion of the FOV of display 226 that extends below waterline 205. In certain embodiments, memory 222 may include data such as, for example, navigational database 222a and/or integrated model 222b.

In the embodiment shown in FIG. 2, system 220 includes OPS 225. In some embodiments, controller 221 may be configured to receive the sonar data, the radar data, and/or image data based on a measured position and/or orientation provided by OPS 225. OPS 225 may be implemented as one or more orientation sensors, GNSS sensors, differential GNSS sensors, orientation/position reference transducers and/or optical sensors (e.g., for actuators), visible spectrum and/or infrared imaging modules, and/or other sensors configured to measure a relative and/or absolute orientation and/or position of system 220 and/or each of imaging modules 223 and 224 and display 226 and provide such measurements to controller 221. For example, in one embodiment, OPS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of system 220 from the size and/or position of the infrared registration marks and/or other related characteristics of system 220 in image data captured by the one or more remote infrared imaging modules. Such relative position and/or orientation may be relative to a position and/or orientation of the remote infrared imaging modules and/or mobile structure 101.

In some embodiments, OPS 225 may be distributed amongst the various modules of system 220 and include one or more individual module OPSs configured to measure orientations and/or positions of image modules 223 and/or 224, radar 229, other ranging sensors, and/or a separate display OPS configured to measure a position and/or orientation of display 226. In various embodiments, controller 221 may be configured to combine image data and sonar data according to OPS measurements and/or measurements of an orientation and/or position of a coupled sonar system (e.g., from a corresponding OPS) and/or mobile structure to produce combined imagery, such as visible spectrum images of scene 200 above waterline 205 and/or three dimensional sonar images of scene 200 below waterline 205. In other embodiments, controller 221 may be configured to use orientation and/or position measurements of system 220, imaging modules 223 and 224, radar 229, display 226, other ranging sensors, and/or mobile structure 101 to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226. In various embodiments, controller 221 and memory 222 may be integrated together, for example, or may be implemented in a distributed manner across a number of individual controllers and/or memories.

Display 226 may be implemented as one or more LCDs, OLEDs, touch screen displays, projection devices, and/or other digital displays that may be configured to display image data from imaging modules 223 and 224, sonar data (e.g., from sonar system 110 of FIGS. 1A and 1B), radar data, integrated model 222b rendered by controller 221, and/or other image data, to user 290. In various embodiments, display 226 may be characterized by an FOV that is a function of the available pixel dimensions of display 226, the position and/or orientation of display 226, the FOVs of imaging modules 223 and/or 224, an effective optical zoom level applied to the image data provided by imaging modules 223 and/or 224, and/or similar characteristics of other navigational and/or ranging sensors. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of system 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communication module 227 may be implemented as any wired and/or wireless interface configured to communication sensor data, configuration data, parameters, and/or other data and/or signals between system 220 and other elements of mobile structure 101 (e.g., as shown in FIGS. 1A and 1B) and/or amongst modules of system 220. As described herein, in some embodiments, communication module 227 may be implemented in a distributed manner such that portions of communication module 227 are implemented within one or more modules of system 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of system 220. In some embodiments, other modules 228 may include various environmental sensors providing measurements and/or other sensor signals that can be displayed to a user and/or used by other devices of system 220 (e.g., controller 221) to facilitate operation of system 220. Such environmental sensors may include sensors configured to determine cloud, wind, precipitation, or wind conditions of an environment around mobile structure 101. In some embodiments, other modules 228 may include one or more buttons and/or other user input devices configured to accept manual user input. In other embodiments, other modules may include one or more distance and/or user presence detectors configured to detect user 290 and/or measure or estimate a distance between display 226 and user 290.

In various embodiments, system 220 may be implemented in a single housing 240 with a single display (e.g., display 226) adapted to be held by user 290 while user 290 views the display. In other embodiments, housing 240 may be mounted to a mobile structure using a fixed or actuated mount to provide a fixed or actuated view relative to an orientation of mobile structure 101. In some embodiments, system 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

Figure 3:
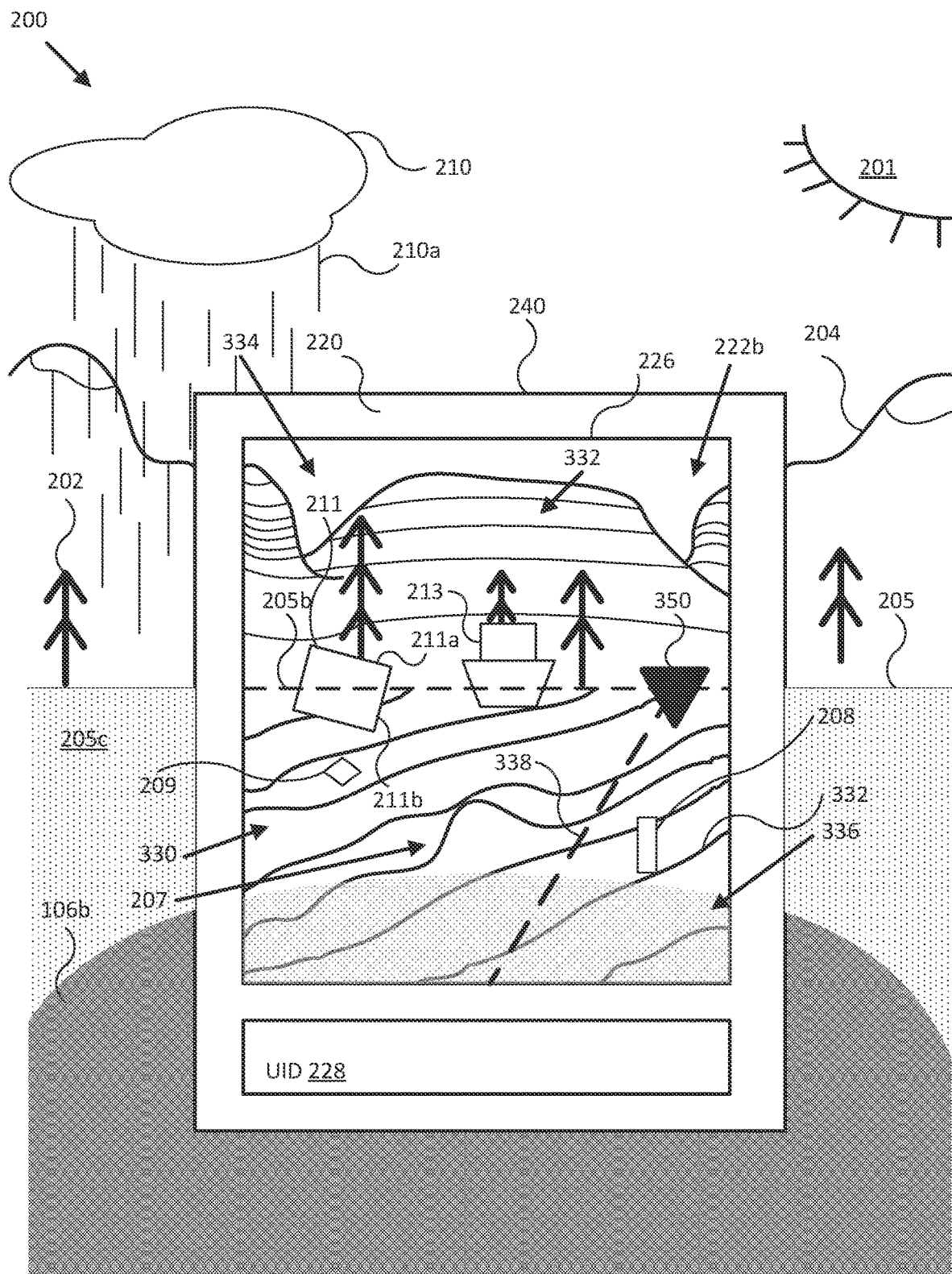
FIG. 3 illustrates a diagram of a display of a sensor fusion navigational system in accordance with an embodiment of the disclosure.

FIG. 3 illustrates a diagram of a display of a sensor fusion navigational system in accordance with an embodiment of the disclosure. In the embodiment shown in FIG. 3, system 220 is oriented to illustrate imagery as integrated model 222b that is displayed by display 226 as viewed by user 290 of FIG. 2, where the effective optical zoom level is adjusted to reproduce a direct view of scene 200 (except for a relatively small portion of the direct view obscured by housing 240 and/or user input device 228.

Scene 200 includes features above waterline 205 illustrated in FIG. 2 and additionally includes mountains/land features 204, tree 202, vehicle 213, floating object 211a, surface 205c of body of water 205a, and deck 106b (e.g., of mobile structure/boat 101 in FIG. 1B). Also shown in FIG. 3, and in particular in the FOV of display 226, are detected waterline 205b, portion 330 of the FOV that extends below waterline 205b, and portion 334 of the FOV that extends above waterline 205b. System 220 may in some embodiments be configured to render detected waterline 205b in display 226 to illustrate a detected location of waterline 205 relative to the FOV of display 226. Portion 330 may include imagery representing bottom feature 207, fish 208, submerged object 209, and the submerged portion of the floating object 211b similar to objects illustrated in FIG. 2. For example, as shown in FIG. 3, portion 330 may include a number of contour lines 332 rendered by a controller (e.g., controller 221 of FIG. 2) to distinguish depths, relative distances, various characteristics of bathymetric data, and/or other characteristics of underwater features. Additionally or alternatively, contour lines 332 may be rendered by the controller in portion 334 above the waterline. The contour lines 332 above the waterline 205 may distinguish elevation, relative distances, and various other characteristics of terrestrial features.

Alternatively or additionally, portion 330 may include icons and/or other types of graphical indicators configured to illustrate a position and/or distance to fish 208, submerged object 209, floating object 211b and/or to distinguish between the various objects (e.g., based on fish detection processing performed on acoustic returns from fish 208, submerged object 209, and/or floating object 211b). For example, icon 350 may be rendered to show a planned destination for mobile structure 101. The planned destination may be a destination inputted into the controller by a user. Additionally, suggested route 338 may also be rendered. Suggested route 338 may be a route determined by the controller to best guide the operator (who may or may not be the user) of mobile structure 101 to the planned destination indicated by the icon 350.

In certain embodiments, the controller may use data from one or more sensors to offer an enhanced view. For example, in FIG. 3, rain 210a may be present. However, display 226 may combine information from a plurality of sensors and render the scene 200 in display 226 without the presence of rain 210a. In certain embodiments, the controller may be able to "see through" the rain by, for example, using radar data or image data and determining the presence of rain and so removing the rain from the image. In certain such embodiments, the controller may distinguish between rain or other weather (such as fog, win, etc.) that may not have an effect on navigation and rain or other weather that may have an effect on navigation. For example, the controller may, from sensors that may detect wind speed, third party weather data, or weather data from other vessels and installations, determine whether rain and/or other weather data is representative of a storm (e.g., a hurricane) or other bad weather condition. In such cases, the controller may then render the weather, graphics indicative of the weather, or a warning on display 226 to warn the user of the weather. In other embodiments, the controller may render the weather, graphics indicative of the weather, or messages to indicate the weather even if the weather data does not indicate that the weather conditions are representative of that of a storm or other bad weather.

In certain embodiments, the controller may additionally be configured to forecast future weather conditions around mobile structure 101 from the weather data and/or other data. For example, the controller may use the weather data from the sensors as well as data indicating weather conditions around mobile structure 101 to forecast future weather conditions. In such an embodiment, data indicating wind speed, the position of the sun, the location of mobile structure 101, the positioning of the clouds, the barometric pressure, current and historical precipitation, and other environmental factors may all be considered in forecasting future weather conditions.

Although the FOV of display 226 in FIG. 3 is shown to include both portions 330 and 334, a different position and/or orientation of display 226 and/or system 220 could result in portion 330 or 334 encompassing the entire FOV of display 226. In certain embodiments, portions 330 and 334 may be rendered in different manners (e.g., with 3D graphics for the portion 334 and with contour lines for the portion 330) and/or rendered with data from different sensors or from a combination of sensors. In other embodiments, portions 330 and 334 may be rendered in the same manner (e.g., with contour lines for both portions) and/or rendered with data from the same sensors.

In some embodiments, age or source of sonar data may be differentiated by rendering substantially real time sonar data differently from prior-acquired and/or survey map sonar data (e.g., a $3^{rd}$ party provided chart or collection of bathymetric data for a particular body of water stored in memory, such as memory 222 of FIG. 2). For example, substantially real time sonar data may be rendered in color and prior-acquired and/or survey map sonar data may be rendered in greyscale. In some embodiments, a relative age of once real time sonar data may be indicated by reducing a chrominance level of the sonar data as the sonar data ages. In additional embodiments, system 220 (e.g., controller 221 of FIG. 2) may be configured to detect or determine various surfaces of underwater features based on acoustic returns from the surfaces and/or one or more volumetric renderings of corresponding sonar data, and the relative or absolute orientations of the various surfaces may be determined from the volumetric renderings. In such embodiments, system 220 may be configured to indicate the relative or absolute surface orientations in portion 330 by mapping the surface orientations to a color and/or intensity map and rendering the sonar data corresponding to the determined surfaces in a corresponding color. In addition, $3^{rd}$ party provided charts and/or bathymetric data may be updated with sonar data and/or any other data received by the controller 130. As charts may contain errors, using the sonar data to update the charts may allow for such errors to be corrected.

Also shown in portion 330 of the FOV of display 226 is overlapping portion 336, which indicates where deck 106b would otherwise obscure direct view of surface 205c. In some embodiments, system 220 may be configured to determine whether portion 330 overlaps with a view of a mobile structure disposed on surface 205c (e.g., mobile structure 101 of FIG. 1A or 1B), thereby forming overlapping portion 336. If overlapping portion 336 exists, system 220 may be configured to blend image data of mobile structure 101 (e.g., captured by imaging modules 223 and/or 224) with sonar data in overlapping portion 336 and rendering the blended data in the overlapping portion 336. In embodiments where system 220 is worn by a user and generally occludes direct view of the user's surroundings, the blended imagery can provide a user with a view of sonar data beneath mobile structure 101 but protect the user from stumbling into objects on mobile structure 101 and/or walking off deck 106b.

Display 226 may also show vehicle 213 and/or floating object 211. In certain embodiments of display 226, the controller may recognize that vehicle 213 and/or floating object 211, as well as other objects, overlaps portion 334 above waterline 205 and portion 330 below waterline 205. In certain such embodiments, the controller may render vehicle 213 and/or floating object 211 as one object (by fusing data from multiple sensors) and/or render the vehicle 213 and/or the floating object 211 using data from a single sensor instead of rendering the above water and underwater portions of the vehicle 213 and/or the floating object 211 in different manners and/or using different data from different sensors to determine the above water and underwater portions of the respective objects. In certain other embodiments, the vehicle 213 and/or the floating object 211 may be rendered in different degrees of transparency so that terrain features behind the vehicle 213 and/or the floating object 211 (such as the tree behind the objects in FIG. 3) may be viewable by the user. In certain such embodiments, the user may select the level of transparency of the vehicle 213 and/or the floating object 211 rendered within display 226.

Figure 4:
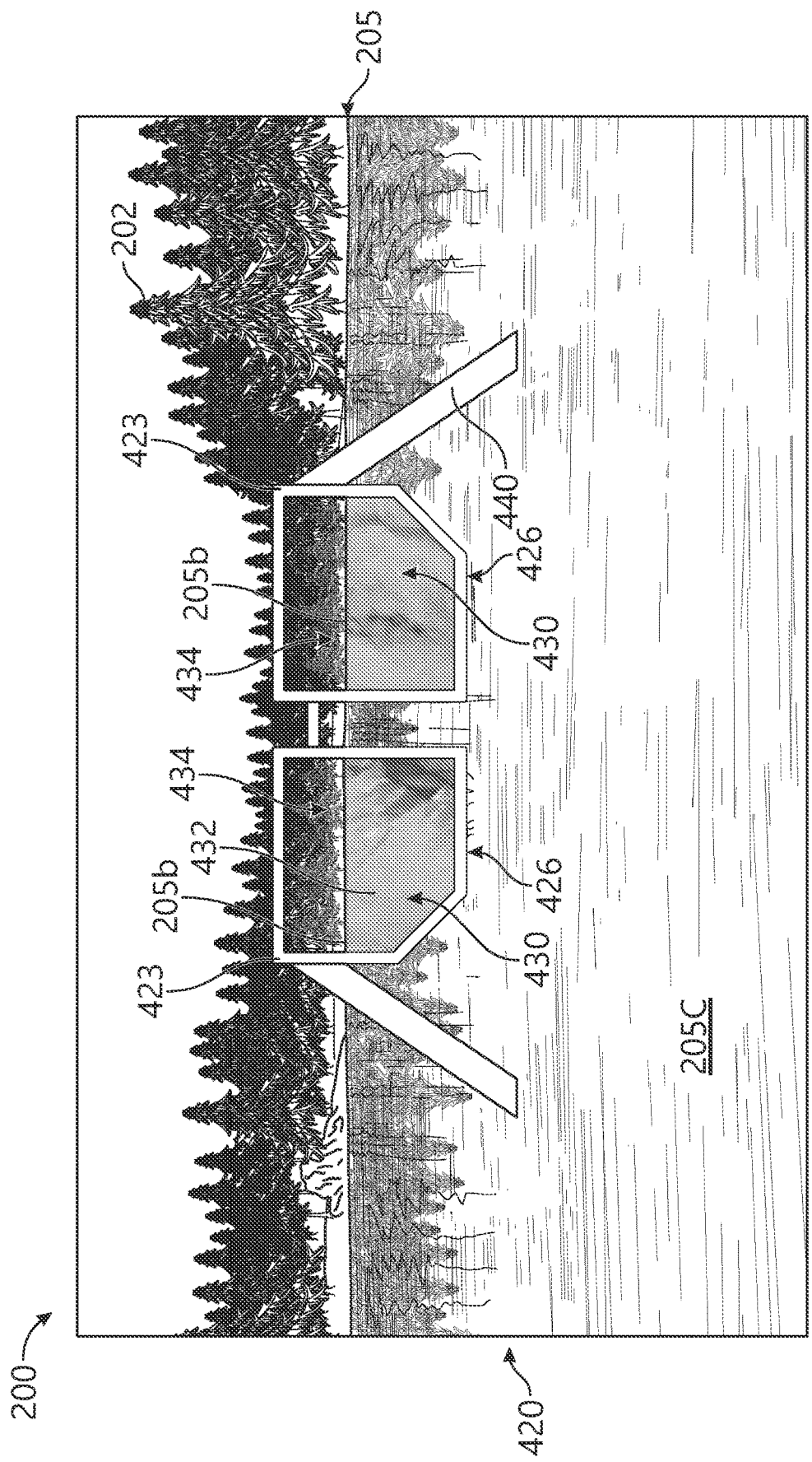
FIG. 4 illustrates a diagram of an augmented reality sensor fusion navigational system in accordance with an embodiment of the disclosure.

FIG. 4 illustrates a diagram of an augmented reality sensor fusion navigational system in accordance with an embodiment of the disclosure. In various embodiments, portable imaging device 420 may be implemented with similar functionality as that described with reference to system 220 in FIGS. 2 and 3. In the embodiment shown in FIG. 4, wearable portable imaging device 420 is oriented to illustrate imagery displayed by displays 426 (e.g., one per user eye) as viewed by a user wearing portable imaging device 420, where the effective optical zoom level is adjusted to reproduce a direct view of scene 200 (except for a relatively small portion of the direct view obscured by imaging modules 423 and/or frame 440).

FIG. 4 includes some of the features above waterline 205 illustrated in scene 200 of FIGS. 2 and 3, and, in particular in the FOV of displays 426, includes detected waterlines 205b, portions 430 of the FOV that extend below respective waterlines 205b, and portions 434 of the FOV that extend above respective waterlines 205b. Portions 430 may include color and/or intensity shading 432 rendered by a controller (e.g., controller 221 of FIG. 2) to distinguish depths, relative distances, various characteristics of bathymetric data, and/or other characteristics of various underwater features.

As illustrated in FIG. 4, wearable portable imaging device 420 may include one or more imaging modules 423, which may be implemented as visible spectrum and/or infrared imaging modules configured to provide monocular (e.g., copied to both displays 426) and/or stereoscopic image data depending on the number and arrangement of imaging modules and the type of image processing applied to image data provided by imaging modules 423. In addition, an OPS (e.g., OPS 225 of FIG. 2) may be integrated with any of imaging modules 423, displays 426, and/or frame 440 and be configured to provide a position and/or orientation of one or more of the features to facilitate determining FOVs for displays 426. In some embodiments, portable imaging device 420 may be configured to determine portion 430 of the FOV of display 426 and use an OPS and actuator in an associated transducer assembly (e.g., actuator 116 coupled to transducer assembly 112 of sonar system 110 in FIG. 1B) to ensonify at least a subset of portion 430 substantially in real time as a user adjusts a position or orientation of wearable portable imaging device 420 by, for example, moving the user's head. Sonar data provided by the associated transducer assembly may be rendered using position data and/or orientation data provided by the OPS to correlate the sonar data with portion 430, for example, and/or to facilitate other rendering processing described herein.

In some embodiments, displays 426 may be implemented with substantially transparent display panels, where the only portions of displays 426 that obscure a direct view of scene 200, as seen by a user wearing portable imaging device 420, are those portions actively displaying rendered image data. In such embodiments, portable imaging device 420 may be configured to render and display portions 430 and/or detected waterlines 205b using displays 426 without also rendering portions 434. Power for portable imaging device 420 may be embedded within frame 440 and/or electrically coupled to portable imaging device 420 through use of a wire harness and/or an external power source, such as a battery pack or a power source for a mobile structure.

Figure 5:
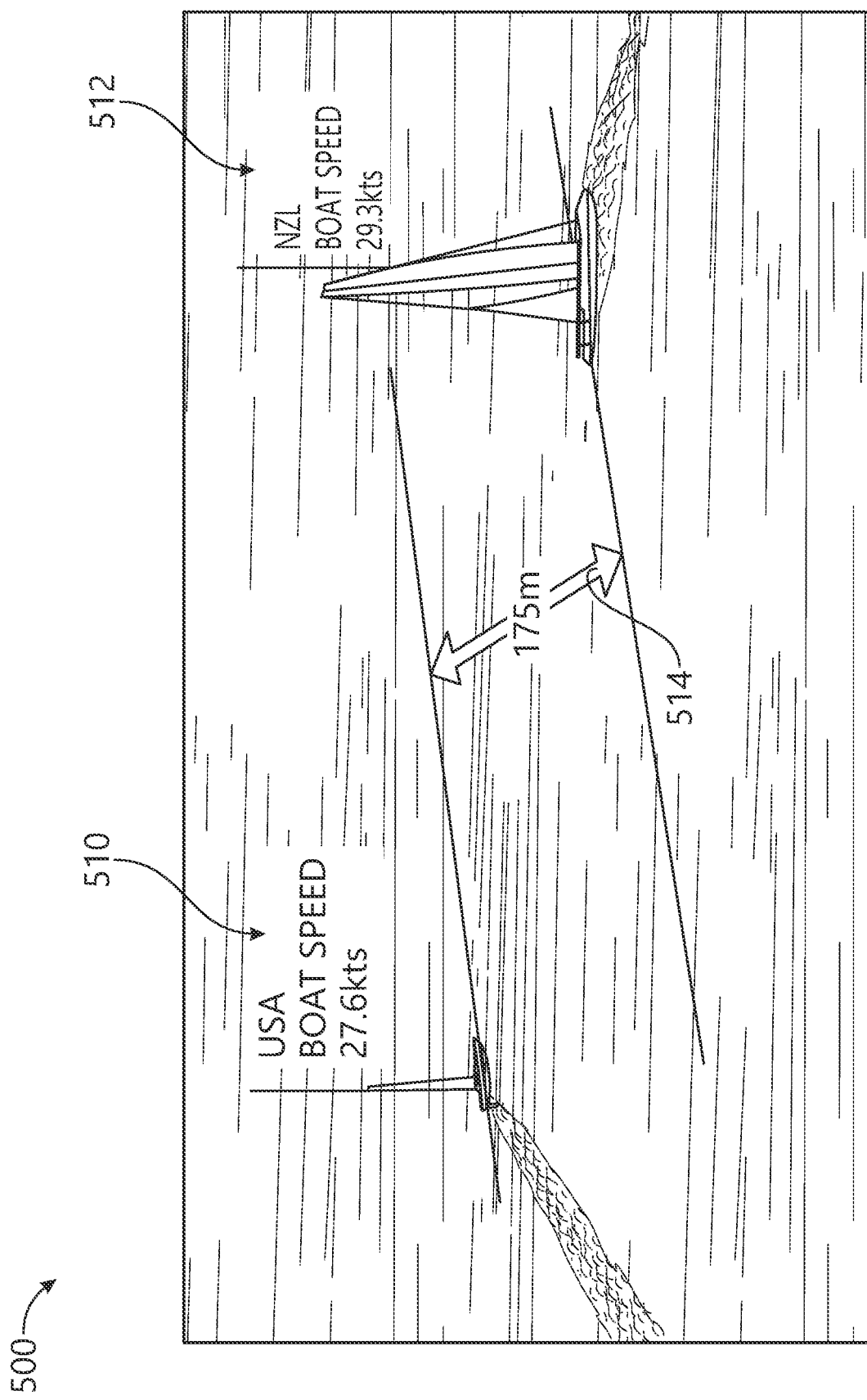
FIG. 5 illustrates a diagram of an information display of a sensor fusion navigational system in accordance with an embodiment of the disclosure.

FIG. 5 illustrates a diagram of an information display of a sensor fusion navigational system in accordance with an embodiment of the disclosure. Information display 500 of FIG. 5 may be a rendering by a display or a portion of a display. Information display 500 shown in FIG. 5 may include a first vessel 510, a second vessel 512, and information graphic 514. In certain embodiments, the rendering shown in FIG. 5 may be a 2D or 3D graphic rendering showing the scene from a view different from the point of view of the user, who may be located on a mobile structure, for example.

FIG. 5 shows information display 500 that may fuse data from multiple sensors. For example, the position of the first vessel 510 and the second vessel 512 may be determined from AIS data, radar image, image data, sonar data, GNSS data, and/or other types of data. Additionally, the country of registry of the first vessel 510 and the second vessel 512 may be determined through such navigational data or other navigational data. The country of registry of the first vessel 510 and/or the second vessel 512 may then be rendered in the display within the vicinity of the first vessel 510 and/or the second vessel 512. Other data, such as the speed of each vessel, may also be determined from navigational data (e.g., from radar data, sonar data, or from AIS data) and rendered.

Additionally, information display 500 in FIG. 5 may also display the distance between first vessel 510 and second vessel 512. The distance between first vessel 510 and second vessel 512 may be determined from certain navigational data (e.g., radar data, image data, AIS data, sonar data, and other navigational data). The distance between first vessel 510 and second vessel 512 may be displayed by information graphic 514. Information graphic 514 may be rendered in a fashion designed to be easily viewable by a user. For example, the font of the information graphic 514 may be selected to be easily readable and the color of the font may be selected, and possibly changed, to be easily distinguishable from the background.

Various other embodiments may display other information with other information graphics. For example, an embodiment may display the relative velocities of the two vessels, or may display the rate of change between the distances of the two vessels. The display may present any information that may be determined by a controller with the information graphic.

Figure 6:
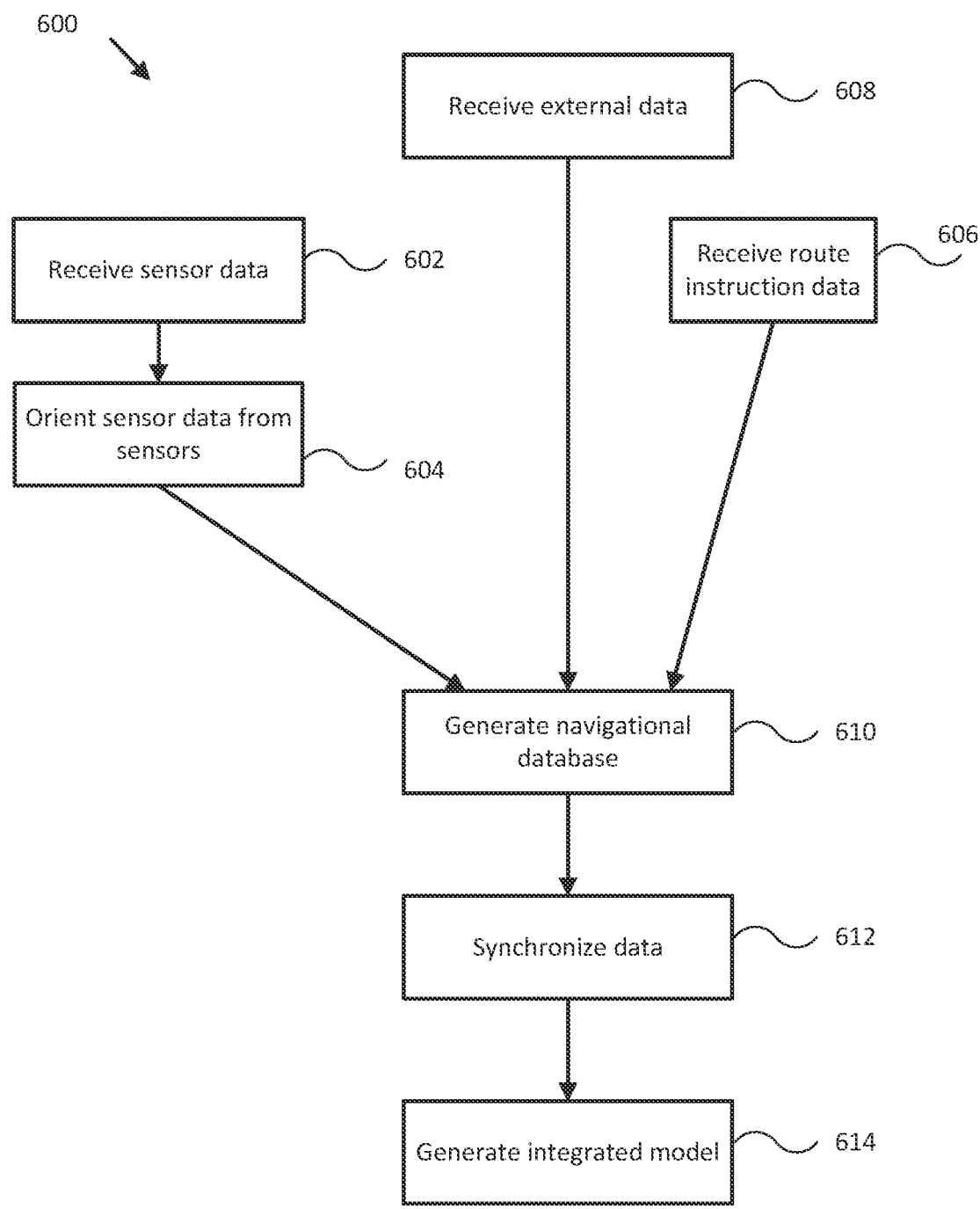
FIG. 6 illustrates a flowchart of a process for sensor fusion for navigational systems in accordance with an embodiment of the disclosure.

FIG. 6 illustrates a flowchart of a process for sensor fusion for navigational systems in accordance with an embodiment of the disclosure. It should be appreciated that any step, sub-step, sub-process, or block of process 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 600 is described with reference to systems described in reference to FIGS. 1-5 and 7, process 600 may be performed by other systems different from those systems and including a different selection of electronic devices, sensors, assemblies, mobile structures, and/or mobile structure attributes.

In block 602, sensor data is received. For example, controller 130 may be configured to receive navigational data from sonar system 110, sensors 140-146, a radar or other ranging sensor system (e.g., other modules 180), and/or other sensors. In some embodiments, such navigational data may include corresponding position and/or orientation data, as described herein.

In block 604, sensor data from the sensors is oriented. For example, controller 130 may be configured to orient sensor data using, for example, data from an OPS of a sensor to determine an orientation and/or position of such a sensor. Such an OPS may generate orientation and/or position data and such orientation and/or position data may then be integrated into the navigational data and/or sent along with navigational data from the sensor to be used to orient sensor data.

In block 606, route instruction data is received. For example, controller 130 may be configured to receive route instruction data that may be related to the route of mobile structure 101. Such route instruction data may be input by a user, from a remote device, or from some other source. Route instruction data may inform controller 130 of a destination and, in response, controller 130 may then determine, for example, a route for mobile structure 101. Such a route may be determined using distance, time, weather conditions, sea conditions, the location of other mobile structures, jurisdiction considerations, as well as other factors. Route instruction data may contain information related to one destination or multiple destinations.

In block 608, external data is received. For example, controller 130 may be configured to receive external data. The external data may be any data not generated by sensors mounted on mobile structure 101. For example, image data from devices not mounted on mobile structure 101, GNSS and/or other position data from other mobile structures, and data from the internet may all be received by the controller. Such data may aid in at least one aspect of navigating mobile structure 101.

In block 610, a navigational database is generated. For example, controller 130 may be configured to generate navigational database 222a, which may include sensor data, external data, route instruction data, orientation and/or position data, as well as other data. The navigational database may fuse together data from multiple sensors.

In block 612, data is synchronized. For example, controller 130 may be configured to synchronize data within navigational database 222a. Such data may be synchronized by, for example, grouping sensor data according to corresponding orientation and/or position data, grouping data obtained at substantially the same time (e.g., obtained within 1 second of each other), grouping data related to a similar aspect (e.g., grouping all data related to underwater features together), grouping data obtained from a particular sensor, multiple similar sensors, or from the same or similar source, grouping data according to user selection, and/or grouping data according to another methodology, for example, and/or otherwise synchronizing, partitioning, and/or grouping the data within navigational database 222a. Certain embodiments may additionally include multiple such groupings.

In block 614, an integrated model is generated. For example, controller 130 may be configured to generate integrated model 222b from navigational database 222a (generated in block 610). For example, some or all of data within navigational database 222a may be used to generate integrated model 222b. In some embodiments, integrated model 222b may be a 2D or 3D representation of the environment near and/or proximate mobile structure 101. As a non-limiting example, image data, sonar data, radar data, and/or other data within navigational database 222a may be used to generate integrated model 222b. In various embodiments, integrated model 22b may facilitate and/or include forecasting, compensating, and/or autopilot capabilities.

For example, controller 130 may be configured to determine if data from a sensor or multiple sensors are unavailable (e.g., sensor data from sensors mounted on mobile structure 101 such as the sonar data, the radar data, the visual imaging data, the thermal imaging data, data from environmental sensors, OPS data, and other data as well as data from external sources such as GNSS data, AIS data, and weather data). The controller may primarily generate an aspect of the integrated model from a certain sensor, but if the controller determines that data from the certain sensor is unavailable, the controller may, in response, substitute data from another sensor to generate the aspect of the integrated model. For example, in a certain embodiment, the controller may primarily use radar data to generate terrain of an environment around mobile structure 101 within an integrated model. However, if the controller determines that radar data is unavailable, it may generate the terrain of the environment around mobile structure 101 within the integrated model with visual image data by analyzing the visual image data to determine terrain features.

In some embodiments, image data, orientation and/or position data, and/or sonar data acquired and/or processed in blocks 602-614 may be used to control operation of a mobile structure 101, such as by controlling steering sensor/actuator 150 and/or propulsion system 170 to steer mobile structure 101 to avoid hazards and/or to follow a provided route, to steer mobile structure 101 according to an orientation of display 226, for example, and/or according to positions and/or depths of floor 206, bottom feature 207, fish 208, and/or submerged objects 209 as well as other terrain and weather features.

Figure 7A:
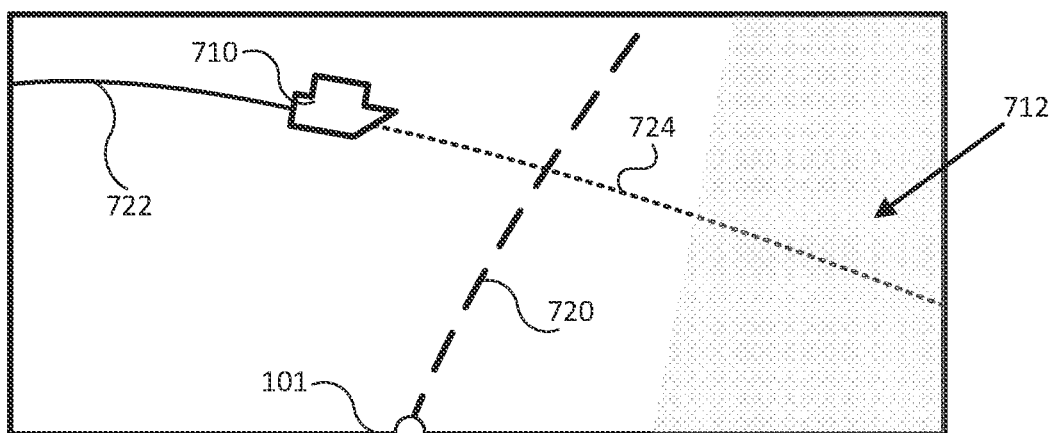
FIGS. 7A-C illustrate an adjusting sequence shown in a display of a sensor fusion navigational system in accordance with an embodiment of the disclosure.
Figure 7B:
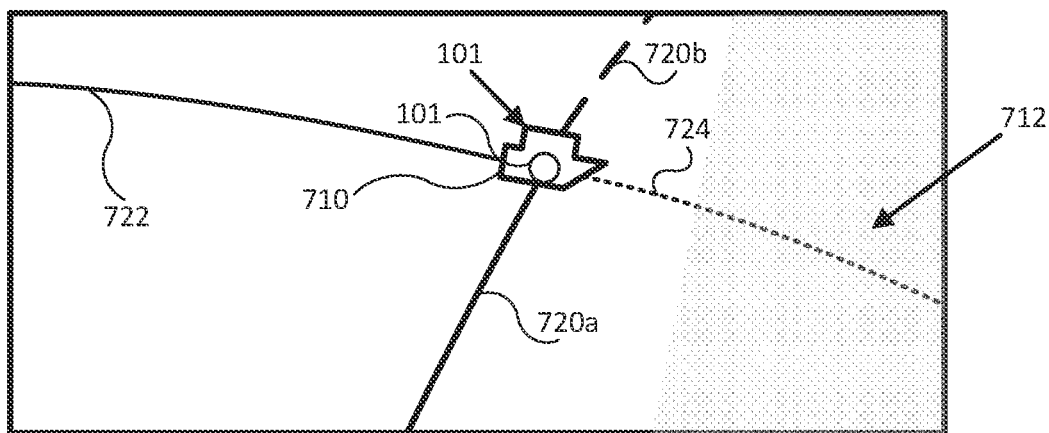
Figure 7C:
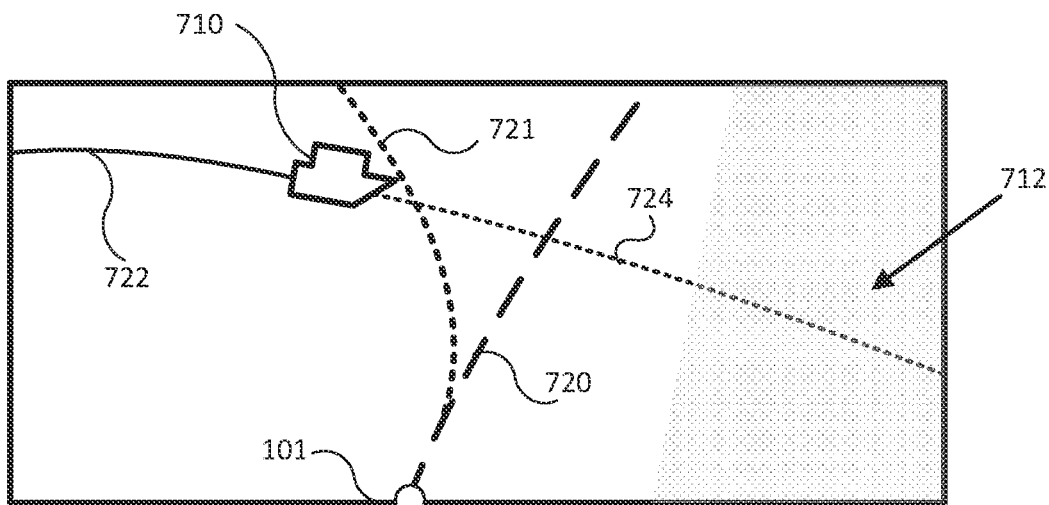

FIGS. 7A-C illustrate an adjusting sequence shown in a display of a sensor fusion navigational system in accordance with an embodiment of the disclosure. FIGS. 7A-C may include mobile structure 101, a vessel 710, a vessel traveled route 722, a vessel projected route 724, a suggested route 720, and an underwater hazard 712. The embodiments shown in FIGS. 7A-C may be generated from sensor data that may, for example, include a time of acquisition associated with the data. The time of acquisition may allow for construction of historical, current, and/or future views of integrated models.

In FIG. 7A, mobile structure 101 may be shown in its current position and a planned destination may have been entered. Suggested route 720 may be determined from such a planned destination. In FIG. 7A, suggested route 720 may be an initial or preliminary suggested route that may not, or may not yet have, taken into consideration projected route 724 of vessel 710.

Additionally in FIG. 7A, vessel 710 (a vessel separate from mobile structure 101) may be shown in its current known position. The current known position of vessel 710 may be determined from AIS data, radar data, image data, sonar data, or other navigational data contained with navigational database 222a. Vessel traveled route 722 may be determined from data of the position of vessel 710 from previous points in time. The data of the previous position of vessel 710 may be time stamped and may be contained within a navigational database.

FIG. 7A may also include vessel projected route 724. Vessel projected route 724 may be determined from navigational data received by a controller. For example, such navigational data may determine a planned destination of vessel 710 by, for example, data transmitted by vessel 710 or transmitted by a third party and controller 130 may then determine a vessel projected route 724 from the planned destination of vessel 710. In other embodiments, vessel projected route 724 may be determined from data communicated from vessel 710, from a third party, or from data preloaded on controller 130. Additionally or alternatively, controller 130 may determine vessel projected route 724 by forecasting from previous movements of vessel 710. Thus, controller 130 may, for example, forecast vessel projected route 724 of vessel 710 from vessel traveled route 722 taking into account a bearing of vessel 710, a speed of vessel 710, current conditions and other environmental conditions, and/or the presence of other vessels, borders, terrain, fixed structures, and mobile structures within the general vicinity of vessel 710.

In FIG. 7B, controller 130 may forecast a potential collision between vessel 710 and mobile structure 101 at point 730. Controller 130 in FIG. 7B may forecast the potential collision by, for example, predicting the location of vessel 710 at a future point in time by taking into account one, some, or all of vessel traveled route 722, the bearing of vessel 710, the speed of vessel 710, current conditions and other environmental conditions, and/or the presence of other vessels, borders, terrain, fixed structures, and mobile structures within the general vicinity of vessel 710.

FIG. 7B may be a predictive view that may be rendered within an integrated model shown in a display. In certain embodiments, the user may be able to fast forward and rewind between renderings showing the past, current, and future (e.g., forecasted) positions of mobile structure 101 (shown at the point of collision in FIG. 7B) and vessel 710. In FIG. 7B, the solid line portion of suggested route 720a shows the path mobile structure 101 is predicted to have traveled by the time mobile structure 101 reaches point 730 in FIG. 7B (and collides with vessel 710) and the solid line portion of vessel traveled route 722 shows the path vessel 710 is predicted to have traveled by the time vessel 710 reaches point 730 and collides with mobile structure 101.

In FIG. 7C, controller 130 may return to the time shown in FIG. 7A and recommend an alternative route 721 to avoid collision with vessel 710. Alternative route 721 may be determined by taking into account any of the factors outlined above as well as other factors such as the characteristics of mobile structure 101 (e.g., the rate of longitudinal and lateral acceleration possible with mobile structure 101). In FIG. 7C, alternative route 721 may be determined by forecasting future positions of vessel 710 based on vessel 710's current bearing and speed as well as vessel 710's projected destination.

Additionally, underwater hazard 712 may be a factor in determining alternative route 721. Underwater hazard 712 may be a highlighted area within an integrated model that mobile structure 101 may be advised to avoid. Underwater hazard 712 may be, for example, a shallow portion of an ocean or a portion with obstacles that may potentially ground or damage mobile structure 101. Underwater hazard 712 may be determined through depth data, bathymetric data, sonar data, image data including thermal and visual image data, and other data. In certain embodiments, underwater hazard 712 may be determined by taking into account characteristics of mobile structure 101 (such as the ability of mobile structure 101 to turn or stop, or a draw of mobile structure 101). Accordingly, if mobile structure 101 requires a longer distance to decelerate or change directions, the area of underwater hazard 712 may be increased.

In certain other embodiments, controller 130 may continuously determine any underwater areas around the vicinity of mobile structure 101 that may include obstacles or be too shallow for mobile structure 101, even when no planned destination has been entered. The controller may do so using one or a combination of sonar data, bathymetric data, image data, GNSS data, and/or other data. Controller 130 may, for example, determine that a certain underwater area has a depth less than a minimum depth for mobile structure or determine obstacles (e.g., crab pots) within the underwater area. Controller 130 may do so by, for example, determining obstacles by sonar bounce back or analyzing images from a thermal imaging module to determine the presence of crab pots. Controller 130 may then project the likely path(s) of mobile structure 101 based on current heading, speed, and control inputs and determine if mobile structure 101 is likely to cross over any underwater areas that may include obstacles, be too shallow, or may offer a danger to mobile structure 101 in other ways. If so, Controller 130 may warn the operator/user of mobile structure 101 of any impending danger. Controller 130 may warn the user a set amount of time before any possible collision/danger may manifest, such as 30 seconds before, 1 minute before, 2 minutes before, or an amount of time before that allows mobile structure 101 to take evasive action (the amount of time possibly determined by the characteristics and/or speed of mobile structure 101).

Referring back to alternative route 721, alternative route 721 may be determined by controller 130 by taking into account the aforementioned factors as well as underwater hazard 712. Alternative route 721 may then be rendered within an integrated model and presented within a display. The operator of mobile structure 101 may then change the path of mobile structure 101 according to alternative route 721, or controller 130 of mobile structure 101 may automatically correct the bearing and speed of mobile structure 101 to match that of alternative route 721.

In various embodiments, controller 130 may be configured to apply various types of image processing to the sonar data when rendering an integrated model, such as processing to visually differentiate real time and prior-acquired sonar data, image data, radar data, and other data, to visually indicate a relative age of different portions of such data, to visually indicate surface orientations of above water and underwater features, and/or to provide additional methods to visually differentiate different above water and underwater features and/or different above water and underwater feature characteristics from one another. Similarly, in some embodiments, controller 130 may be configured to apply various types of image processing to image data when rendering the integrated model, such as processing to differentiate above-water objects from one another in low light or otherwise limited visibility environments.

It is contemplated that any one or combination of methods to provide augmented reality sonar imagery may be performed according to one or more operating contexts of a control loop, for example, such as a startup, learning, running, and/or other type operating context. For example, process 600 may proceed back to block 602 and proceed through process 600 again to produce and updated navigational database and/or integrated model, as in a control loop.

In accordance with various embodiments of the present disclosure, video based sensor fusion navigational systems may be provided by various portable and/or fixed navigational sensors and imaging modules associated with a mobile structure or vehicle. Various types of image stabilization and processing may be used to help fuse sensor data in a more meaningful and intuitive manner for users.

In particular, it is difficult to produce a low cost stabilized camera for use on leisure marine vessels, including man overboard detection, container avoidance, generalized collision awareness, and automatic identification of flag and light signals. For these applications, neither of the primary two existing approaches is suitable: "professional stabilization" (e.g., motor controls with sensors and control systems) is too expensive for mass leisure marine adoption, and land based pan tilt cameras, including those in smart phones, typically do not stabilize with respect to a rotation axis, yet rolling and pitching motions on a ship necessitate that the rolling axis be stabilized.

Present embodiments are directed an imaging module or camera that is fixed to a mobile structure (e.g., a watercraft) and aimed in a particular direction but can produce images that are substantially stabilized with respect to the structure's roll and pitch. The stabilization techniques disclosed herein are primarily in tilt and roll (e.g., from the perspective of the imaging module) and not in yaw and tilt. Furthermore, the amplitude of the correction required can be up to 30° for a heeling sailboat, and the camera may be installed to look forwards, backwards, to port or to starboard, and so the range of correction may need to include 30° in both axes.

Imaging modules 223, 224 may be fixed to mobile structure 101 and, in some embodiments, have pan and/or tilt motors. Pan angles refer to the clockwise-positive angle from the forward direction of mobile structure 101 (e.g., from axis 102 in FIG. 1B), and tilt angles refer to the angle above or below the horizon (positive=up). A typical attitude and heading reference system (AHRS) for a mobile structure will report roll, pitch, and yaw, as described herein (positive=pitch up, roll starboard, yaw starboard).

In order to differentiate the orientation of the imaging module from that of the coupled mobile structure, the following terms are used herein and defined: azimuth is the angle of the optical axis or view of the imaging module clockwise from magnetic or true north (default is true north) similar to heading or yaw, elevation is the angle of the optical axis or view of the imaging module relative to the horizon (elevation angles above the horizon are positive), and slant is the rotation of the imaging module about its optical axis or view (clockwise slants are positive). Accordingly, the relationships between imaging module orientation and mobile structure orientation are azimuth=yaw+pan; elevation=roll*sin(pan)+pitch*cos(pan)+tilt; slant=roll*cos(pan)+pitch*sin(pan)+rotate; where roll and pitch are variable according to the motion of mobile structure 101 and/or imaging module 223, 224, and pan, tilt, and rotate are typically fixed when imaging module 223, 224 is mounted to mobile structure 101 (e.g., without a stabilizing mount).

Figure 8A:
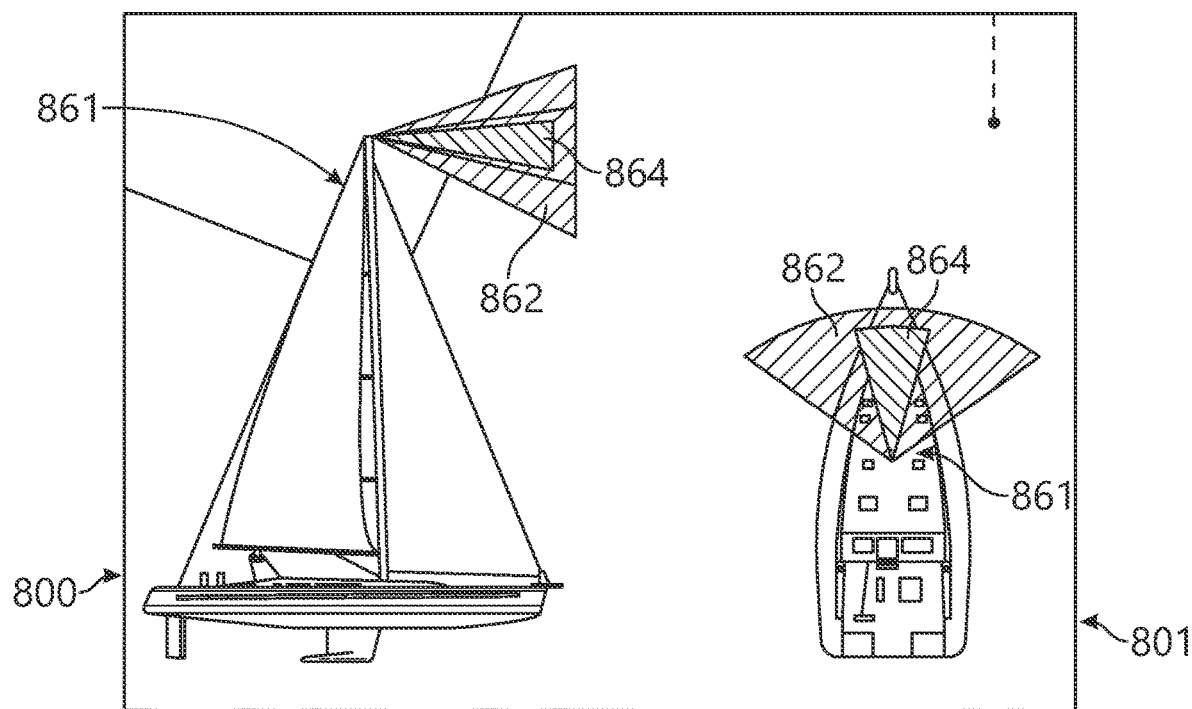
FIGS. 8A-C illustrate various imaging module mounting arrangements for a sensor fusion navigational system with respect to a mobile structure in accordance with embodiments of the disclosure.
Figure 8B:
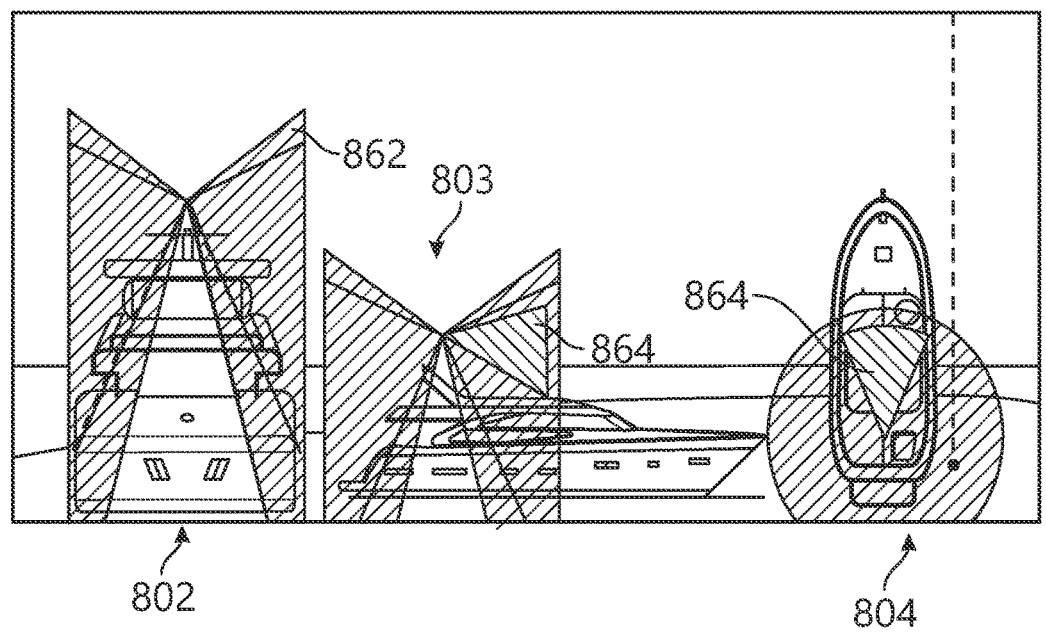
Figure 8C:
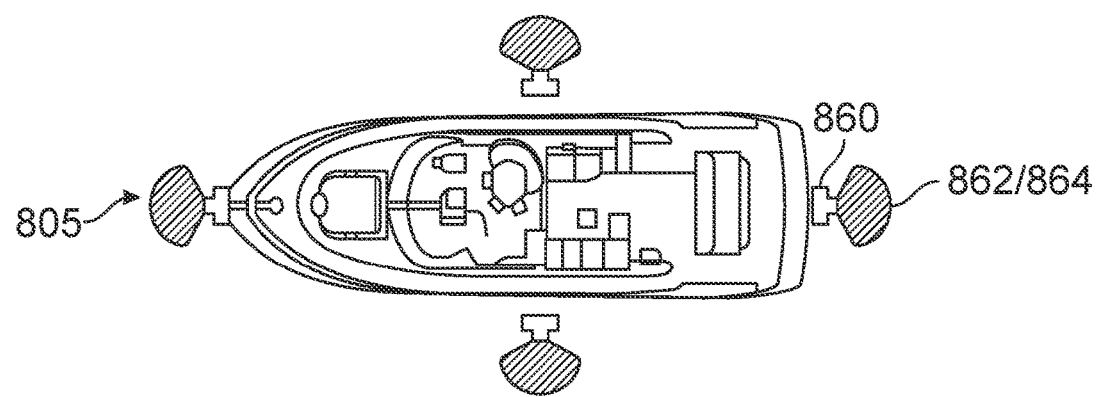

FIGS. 8A-C illustrate various imaging module mounting arrangements for a sensor fusion navigational system with respect to a mobile structure in accordance with embodiments of the disclosure. For example, visible spectrum imaging module 223 and infrared imaging module 224 may be co-located within a single housing (e.g., housing 240 and/or sensor cluster 861) such that their fields of view overlap as shown. In views 800-805 of FIGS. 8A-C, sensor cluster 861 may be mounted to a mast top (view 800) and/or a bridge top (views 801-804), and a number of deck-level sensor clusters 860 may be distributed across a perimeter of mobile structure 101, to provide various shapes of overlapping visible spectrum 862 and infrared 864 fields of view, as shown. In embodiments with multiple imaging modules, overlapping or adjacent fields of view may be stitched together to form a larger field of view. In some embodiments, to avoid a user having to manually configure pan angles for each imaging module (e.g., view 805), an auto-setup can be achieved by circling the boat at a chosen position. The auto-setup algorithm may correlate structure in images moving from one imaging module to the next in sequence as mobile structure 101 circles and determine the relative pan angle of each camera.

Imaging modules 223,224 typically may be fixed mounted or pan/tilt actuated. Multiple imaging modules may be bundled into a single imaging system where, for example, infrared images may be blended with visible spectrum images to provide more intuitive combined or multispectral images, and/or wide fields of view may be created by image stitching. Imaging module orientation should to be accurate to fractions of a degree because object recognition in augmented reality navigation relies on blending images accurately with other navigation data, and because users may see images either in ahead or north-up mode. Imaging module orientations can be obtained in various ways. For example, each imaging module may include an orientation and/or position sensor (OPS), similar to an AHRS, built into it. Alignment (of the accelerometers for Elevation and Slant and of the magnetometer for Azimuth) can be done in the factory against a test image so that the boresight alignment is nearly perfect. This eliminates or reduces the need for horizon recognition as an image processing step because the orientation data accurately provides horizon levelling by itself.

In another example, a mobile structure has its own orientation sensor/AHRS and images captured by the imaging module are stabilized using roll and pitch of the mobile structure by virtue of a communication network linking the imaging module and the remote OPS/AHRS. For a fixed imaging module pointing forwards, small errors in pan, tilt, and rotate can be removed either through user input or by image recognition averaged over a long period of time. A long period of time may be required because horizon recognition is easier in some lighting conditions than others, and because tilt is fixed at install. For a pan tilt actuated imaging module, the same steps are required, but preprocessing is required to add the pan and tilt angles according to the formulas above. In a further example, image analysis can provide a horizon position. Such horizon detection can be easier to perform with infrared imaging modules than with visible cameras because the IR contrast between sky and sea is consistently sharp. A combined IR and visible imaging module/system may therefore use the IR imaging module for horizon detection and apply the tilt and rotate results to captured IR images and visible spectrum images. In various embodiments, image analysis may be used exclusively to provide an orientation of the imaging module and/or a horizon-stabilized image, or it may be used in conjunction with any of the other methods described herein.

In yet a further example, a hybrid system is provided where mobile structure 101 includes a central orientation sensor/AHRS and the imaging module includes an integrated accelerometer and gyro (6 axis mems sensor) OPS. The accelerometers of the mems sensor are accurately aligned to the boresight of the imaging modules in the factory. The horizon levelling is therefore not dependent on the accuracy of the installation of an orientation sensor for mobile structure 101 (users often install an AHRS 2 or 3° off the level). However, the azimuth of the imaging module(s) can be established from a combination of the ship's AHRS and the inertial sensors within the imaging module.

Figure 9:
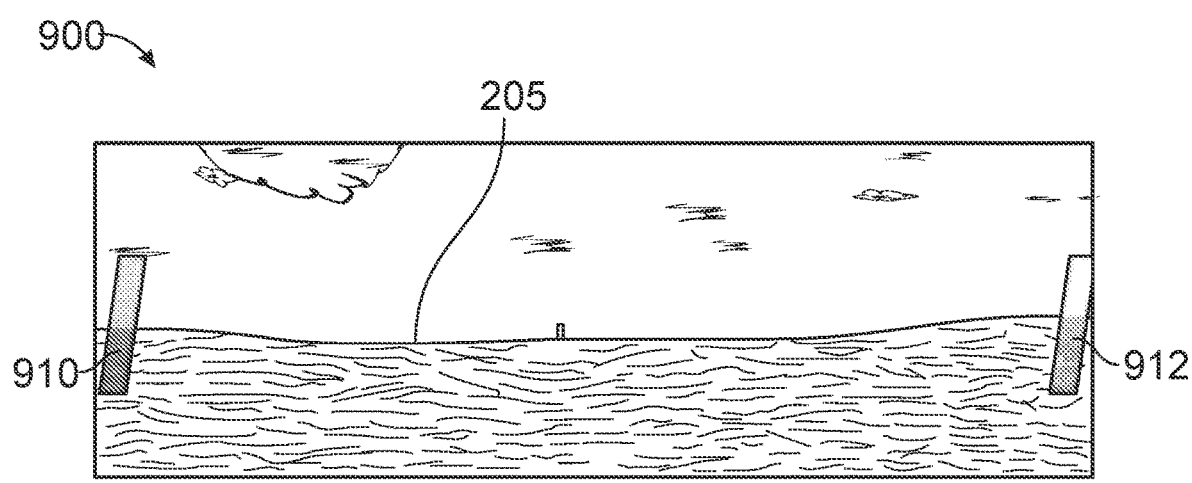
FIG. 9 illustrates a horizon-stabilized image for use in sensor fusion for navigational systems in accordance with an embodiment of the disclosure.

For all such methods, the measured or derived orientation may be slightly imprecise, particularly between images. The human eye is sensitive to frame by frame shifts of even a few pixels, and latency in motion data or horizon contrast profile variations cause shifts of tens of pixels, and so precise image orientation is essential. FIG. 9 illustrates a horizon-stabilized image for use in sensor fusion for navigational systems in accordance with an embodiment of the disclosure, and shows a technique for enhancing the precision of image orientation. For example, precision can be enhanced with minimal computation by analyzing left-of-center vertical strip 910 and right-of-center vertical strip 912 on the left and right of (partially) horizon-stabilized image 900, collapsing their width to a single vertical dimension (e.g., by averaging horizontally), and generating an intensity profile or histogram of the two strips 910 and 912 for comparison to similar strips in prior stabilized images (e.g., stabilized to horizon 205, for example). Intensity profiles or histograms of a stabilized image vertically through the strips should remain approximately the same from frame to frame, if the image is to be jitter free. Therefore, an anti jitter algorithm consists of analyzing a left strip and a right strip, generating corresponding intensity profiles or histograms, and determining how much to slide the strip up or down for a best fit with the equivalent patch from a previous frame. The resulting vertical jitter damping adjustment may be used to translate the stabilized image 900 up or down to reduce or eliminate jitter between images.

In various embodiments, the positions of the strips 910 and 912 may be adjusted to resolve issues with stays, railings, or antennas which may block parts of the field of view. Dirt or salt spray may affect the ability of the algorithm to detect motion, and a mechanical cover could reduce the rate of build-up by shielding the imaging module when the boat is not in use. Alternatively, a hydrophobic coating could reduce the rate of build-up. For all methods where an accelerometer is used, acceleration correction for attitude measurement may be applied. Azimuth may be attached as metadata to each frame so that a multifunction display or controller can extract the image direction from the image.

Figure 10A:
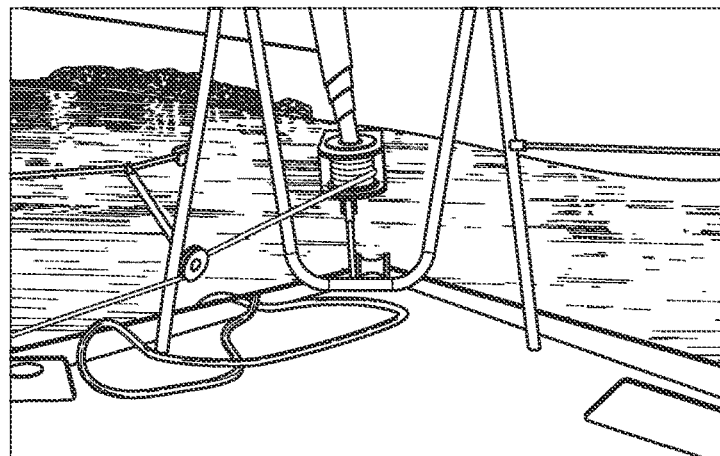
FIGS. 10A-C illustrate image processing steps to generate a horizon-stabilized image for use in sensor fusion for navigational systems in accordance with an embodiment of the disclosure.
Figure 10B:
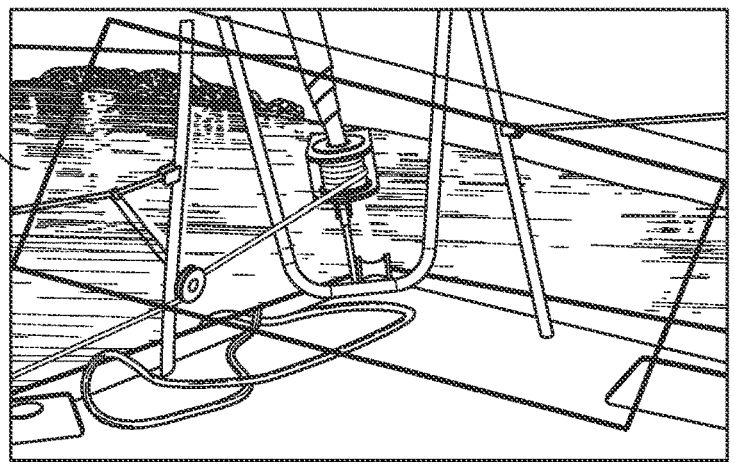
Figure 10C:
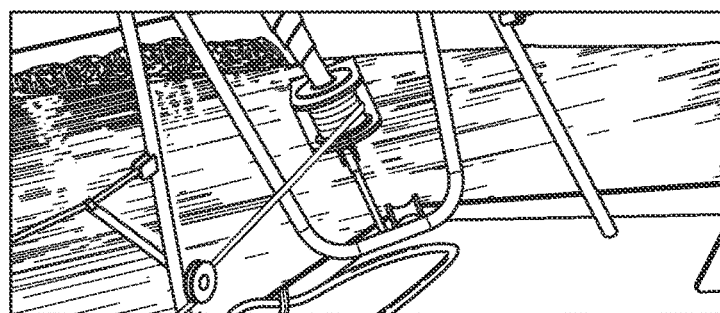

FIGS. 10A-C illustrate image processing steps to generate a horizon-stabilized image for use in sensor fusion for navigational systems in accordance with an embodiment of the disclosure. In various embodiments, slant & elevation may be used to roll and crop a raw image (e.g., image 1000 of FIG. 10A) to produce a horizon-stabilized image (e.g., image 1002 of FIG. 10C). As shown in FIGS. 10A-C, an un-stabilized image is received by controller 130 from imaging module 223, 224, a horizon-stabilized view is determined from the un-stabilized image and orientation and/or position data corresponding to the imaging module 223, 224 (e.g., indicated by box 1010 in FIG. 10B), and image 1001 is rotated, translated, and cropped to generate horizon-stabilized image 1002.

In various embodiments, the motion profile of mobile structure 101 may be taken into account in the crop limits. For example, an imaging module with vertical field of view (VFOV) of 70° might be in use on a watercraft having a pitching range of +/−10°. When steady and level, this image will be cropped so as to lose 10° from the top and 10° from the bottom of the image. When the watercraft is pitching up at 5°, it will be cropped so as to lose 15° at the top and 5° at the bottom, leaving the image appearing centered. This watercraft may also have the capability to roll by +/−10°. When the orientation sensors indicate that the boat is rolled right by 10° and having neutral pitch, the image will need to be rolled right by 10° to compensate, and the cropping of 10° top and bottom will generally be sufficient to avoid diagonal edges of unpopulated pixel locations. The amount of vertical cropping required to ensure that diagonal edges of unpopulated pixel locations (e.g., portions of the scene outside the FOV of the imaging module) are rare depends on the boat's roll range, pitch range, and the image aspect ratio and field of view. For any mobile structure, the expected range of roll and pitch may be factory pre-set, selected by the user, or automatically determined 'on the fly' by analyzing historic boat motion, for example.

Figure 10D:
Figure 10E:

FIGS. 10D-F illustrate pseudocode to generate a horizon-stabilized image for use in sensor fusion for navigational systems in accordance with an embodiment of the disclosure. For example, pseudocode 1020 of FIG. 10D and pseudocode 1030 of FIG. 10E illustrate a method to generate left and right pixel intensity profiles corresponding to respective left-of-center and right-of-center vertical strips of pixels of an image, compare the left and right pixel intensity profiles to prior left and right pixel intensity profiles generated from a prior received image to determine a vertical jitter damping adjustment, and translate the pixels of the received image vertically according to the determined vertical jitter damping adjustment. Pseudocode 1040 of FIG. 10F illustrate a method to determine a slant and elevation of the imaging module corresponding to the received image, rotate pixels of the received image about a center of the received image to at least partially compensate for the determined slant, translate the pixels of the received image to at least partially compensate for the determined elevation, and crop the rotated and translated received image symmetrically about a reference slant and/or a reference elevation to compensate for an expected extent of motion of the mobile structure (and, in some embodiments, to remove unpopulated pixel locations generated by the rotating and translating the received image).

In some embodiments, a slant reference offset and/or an elevation reference offset may be preset, such as by user input for example, to provide horizon-stabilized images that are stable with respect to the horizon but aimed substantially above or below the horizon, or rotated with respect to the horizon, as appropriate or desired for a particular application, such as man overboard local environment imaging scans, for example.

In various embodiments, imaging modules 223, 224 may be coupled to mobile structure 101 by an active or passive mechanically horizon-stabilized mount in order to provide some mechanical stabilization and reduce a need for cropping to generate a horizon-stabilized image. This is particularly important with respect to typical thermal imaging modules, which often have significantly lower pixel densities as compared to visible spectrum imaging modules. For thermal imaging where the pixel density is lower and the cost per pixel is relatively high, the cost of mechanical levelling arrangement may be worthwhile. Embodiments disclosed herein include hybrid mechanical-electronic stabilization (me-stab) techniques. In one me-stab embodiment, a liquid in a sealed container provides a level surface on which the electronics float horizontally. In another me-stab embodiment, an imaging module is mounted on a uni-axis (roll) pendulous platform, providing roll stabilization. In a further me-stab embodiment, an imaging module is mounted along with a 3 axis mems gyro/accelerometer on a pendulous dual-axis gimballed platform (e.g., a dual-axis gimbal is well understood in leisure marine use, as the classical way to keep a fluxgate compass level).

Having provided primary stabilization mechanically in such ways, high frequency electronic stabilization described herein is still desired if not necessary to enable various types of sensor fusion. A problem with gimbal systems is that masthead motion can be violent and a low cost 'point mass' system has dynamics which are difficult to optimize. One solution to this is active damping where a microprocessor reads acceleration and or gyro signals from a mems sensor and applies varying braking forces to the natural pendulous motion of a pendulous gimbal mount. In another me-stab embodiment, a conventional pan/tilt imaging module has its tilt axis actively controlled by a microprocessor with mems sensor inputs, so that the module's elevation angle is held at or close to zero. For narrow FOV cameras this has the benefit than the electronic image processing can be targeted mainly at rotations with minimal cropping for vertical shifts.

Figure 11A:
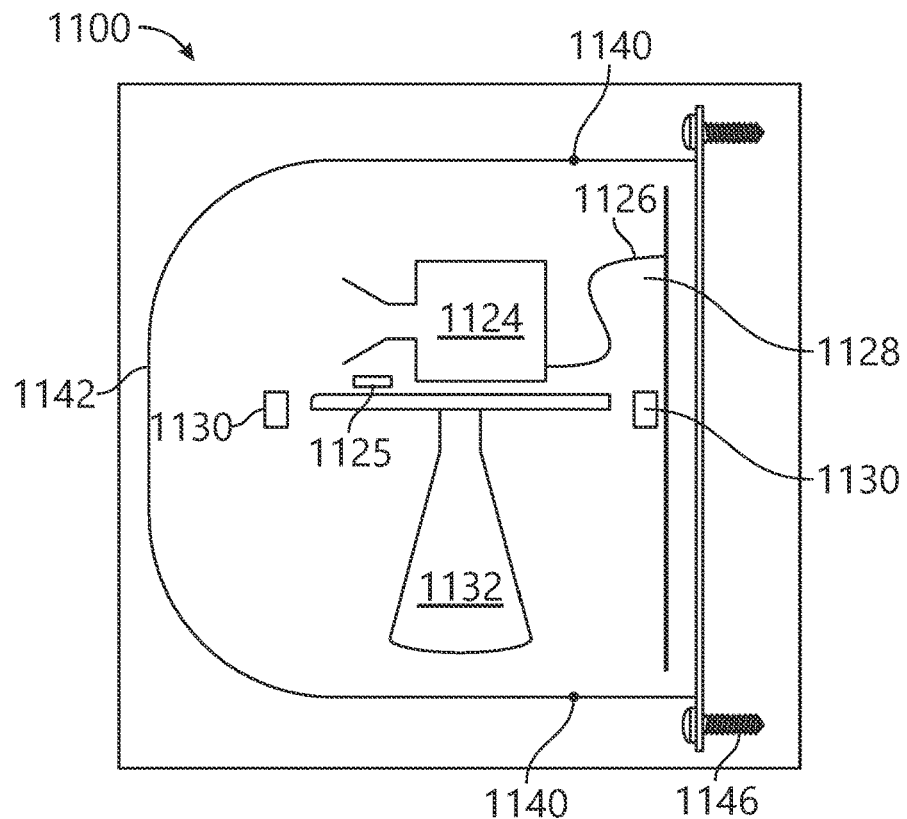
FIGS. 11A-B illustrate mechanical horizon-stabilization mounts for imaging modules to generate horizon-stabilized images for use in sensor fusion for navigational systems in accordance with an embodiment of the disclosure.
Figure 11B:
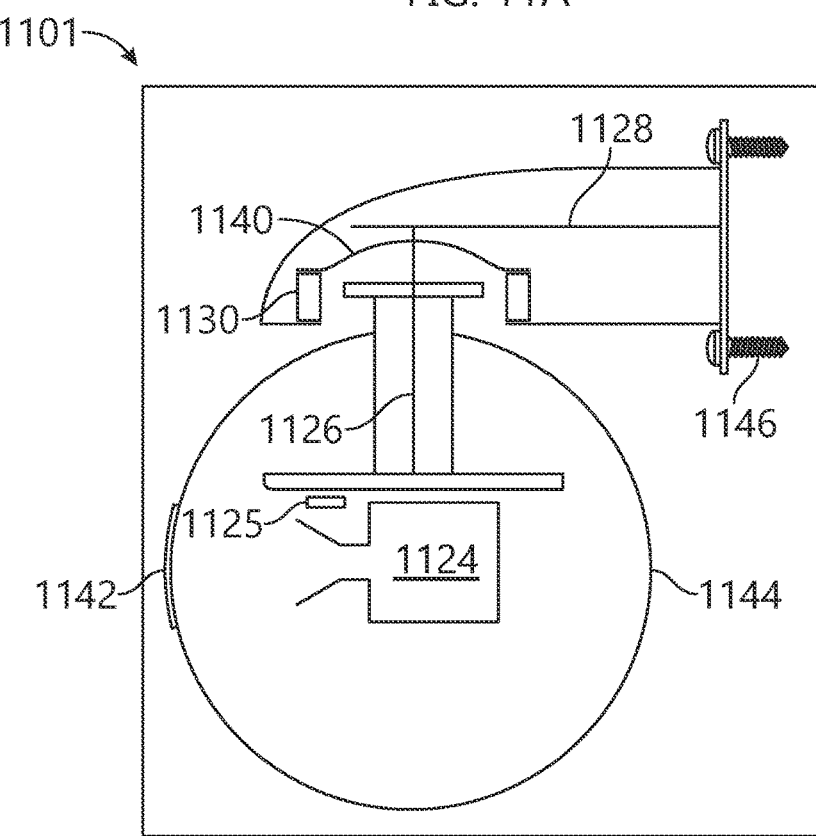

FIGS. 11A-B illustrate mechanical horizon-stabilization mounts for imaging modules to generate horizon-stabilized images for use in sensor fusion for navigational systems in accordance with an embodiment of the disclosure. In FIG. 11A, mount 1100 includes imaging module 1124 and OPS 1125 coupled to balance weight 1132 and swinging freely in one dimension through use of gimbal 1130. Imaging module 1124 is electrically coupled through flex cable 1126 to component board 1128, which may be configured to interface with other elements of system 100, for example. Mount 1100 includes large front window 1142 coupled to the rest of mount 1100 through seal 1140, and the whole assembly is mounted to a vertical bulkhead through fixing screws 1146. Mount 1100 has the advantage of completely enclosing the electronics and all moving parts, so that the case can be screwed directly to a vertical surface (such as the side of a cabin). A top mount embodiment could be provided to allow screwing directly to a deck. However, it may be desirable also to include a thermal imaging module as part of the stabilized payload. In this case, due to the cost of large IR transmissive windows, a further embodiment enabling a smaller IR window may be preferred, such as that presented in FIG. 11B.

FIG. 11B shows mount 1101, which includes almost all the same features as mount 1100, but additionally including shroud 1144 configured to help protect imaging module 1124 and support smaller front window 1142. Additionally, mount 1101 lacks an explicit balance weight and instead relies only on the weight of imaging module 1124 and associated electronics for stability. Also, in part due to the presence of shroud 1144, seal 1140 may be much smaller. In both embodiments, the signal processing may involve mixing the gyro xy and accelerometer xy signals in a kalman filter to achieve a stabilized horizon reference. The image is then dynamically cropped according to the horizontal direction. The mechanical gimbal is capable of keeping the base sensor angle to within 5° of the horizontal, so to achieve a final (post stabilized) FOV of 90°, the camera needs a 100° FOV.

Figure 12A:
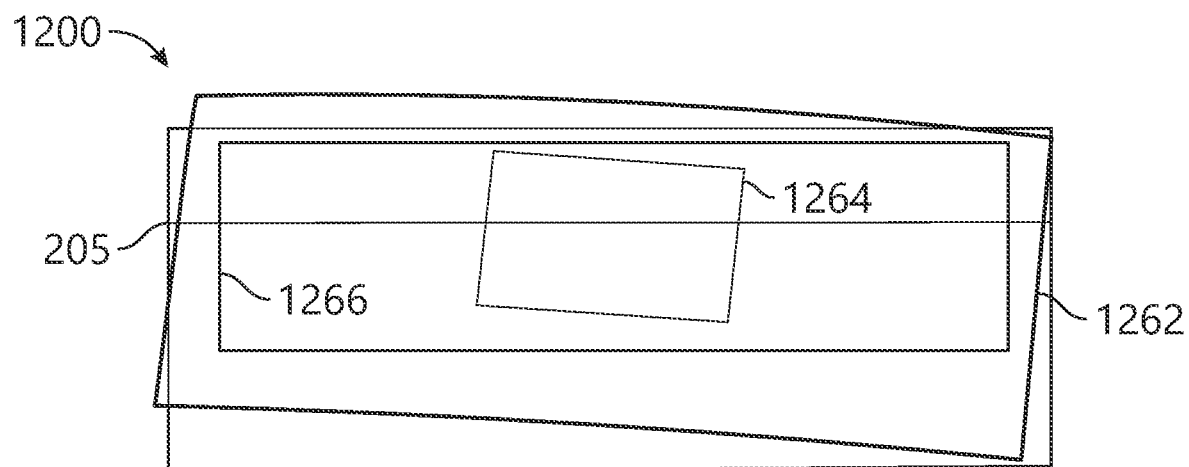
FIGS. 12A-B illustrate image processing steps to generate a horizon-stabilized image for use in sensor fusion for navigational systems in accordance with an embodiment of the disclosure.
Figure 12B:
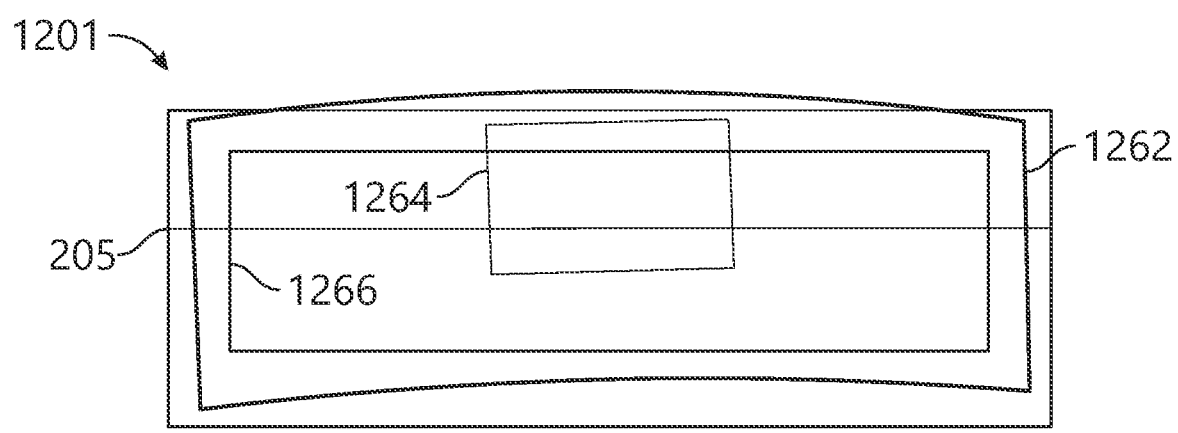

While it is reasonable with a visible imaging module to increase the field of view and crop to eliminate the effects of slant and elevation, with an IR imaging module, the pixels are too expensive to do this. However, users tend to be less demanding with IR images than with visible ones, so it is possible to use persistent pixels from prior stabilized images to fill unpopulated pixel locations (e.g., caused by momentary elevation excursions). For example, FIGS. 12A-B illustrate image processing steps to generate a horizon-stabilized image for use in sensor fusion for navigational systems in accordance with an embodiment of the disclosure. Diagram 1200 of FIG. 12A illustrates a watercraft rolling slightly to starboard with a forward facing thermal imaging module with a narrow field of view 1264 operating in conjunction with a visible camera with a wide field of view 1262. Rectangle 1266 is the horizon-stabilized image rendered to the user. Diagram 1201 of FIG. 12B shows the boat is pitching up, and while the FOV 1262 of the visible camera is large enough to accommodate this, the thermal camera FOV 1264 is now missing too many sea pixels. However, by persisting pixels from the previous scene shown in diagram 1200, the thermal image may be adjust such that the persistence should not be noticed by a user. This persistence technique has advantages over the gimbal approach: it is less costly to manufacture, less likely to fail, and unaffected by boat motion (e.g., lateral accelerations in high speed turns, and mast head motion on sailboats).

For example, in one embodiment, in order to combat this issue, controller 130 may be configured to detect that the determined elevation of the imaging module is outside a predetermined allowable range of elevations, retrieve valid pixels from a prior horizon-stabilized image corresponding to a prior determined elevation of the imaging module being substantially within the predetermined allowable range of elevations, and copy the retrieved valid pixels into corresponding unpopulated pixel locations in the rotated and translated at least one received image, prior to the cropping the at least one received image. Such predetermined allowable range of elevations may be set by a user, a manufacturer, and/or may be determined based on the operating characteristics of mobile structure 101, as described herein.

Regardless of the details of the implementation, various additional signal processing techniques can be useful. If the lost pixels from the cropping are significant, then the cropping can be slightly reduced and image copying of first/last line can be added, with blurring for high roll/pitch angles, or image reconstruction techniques can be used. In a multi camera system, the focus can be shifted to align with the direction the skipper is looking. This can be achieved from another camera included in a multifunction display or otherwise focusing on the skipper's head. The pointing algorithm recognizes the head/eye focus direction, ignores the look-down gesture, and so can focus the image center on the skipper's area of interest automatically. The effect of cropping on height is much more significant than the effect on width, because tilting only affects height, and because wide format images are more affected in height than width for a given roll angle. Therefore, the image becomes letterboxed. This is typically not a problem, because a 100° wide 65° high image losing 10° in width and 25° in height would be 90°×40°, which allows 4 such cameras to see all around mobile structure 101, and provides +/−20° either side of the horizon.

Conventional marine displays take either a top-down viewpoint (charts, radar etc.) or a horizon viewpoint (cameras, thermal cameras etc.). A leisure yachtsman's viewpoint is typically only a few meters above the sea surface, so has a horizontal view. Correlating these 90° opposed viewpoints gives the navigator a difficult mental task. Furthermore, the horizontal view lacks sense of perspective and depth making it unsuited to navigation. A large ship with a bridge deck many tens of meters above sea level, gives the captain an elevated viewpoint, and this helps give perspective, a sense of depth, and also gives a deeper richer image (a view literally from the sea's surface is a long thin line, with no depth at all).

Figure 13A:
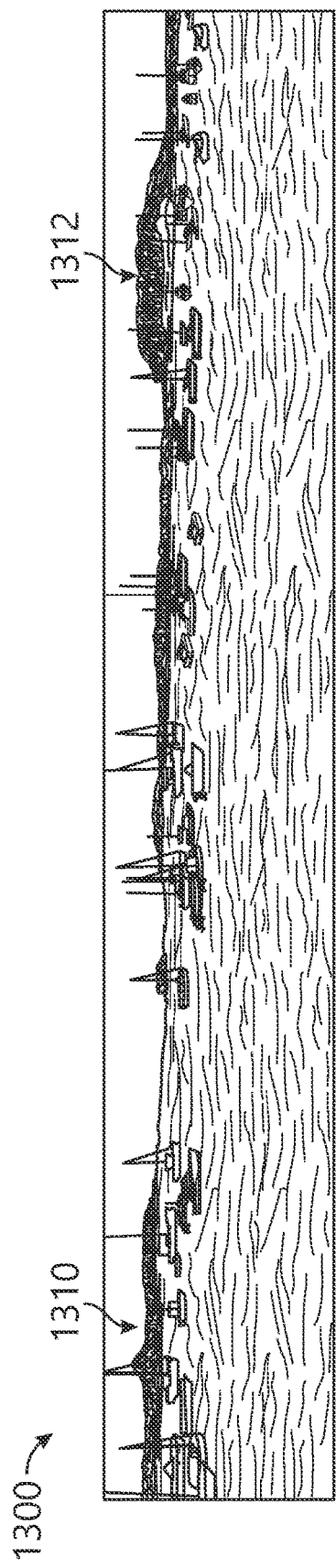
FIGS. 13A-B illustrate benefits provided by viewpoint elevated images for use in sensor fusion for navigational systems in accordance with an embodiment of the disclosure.
Figure 13B:
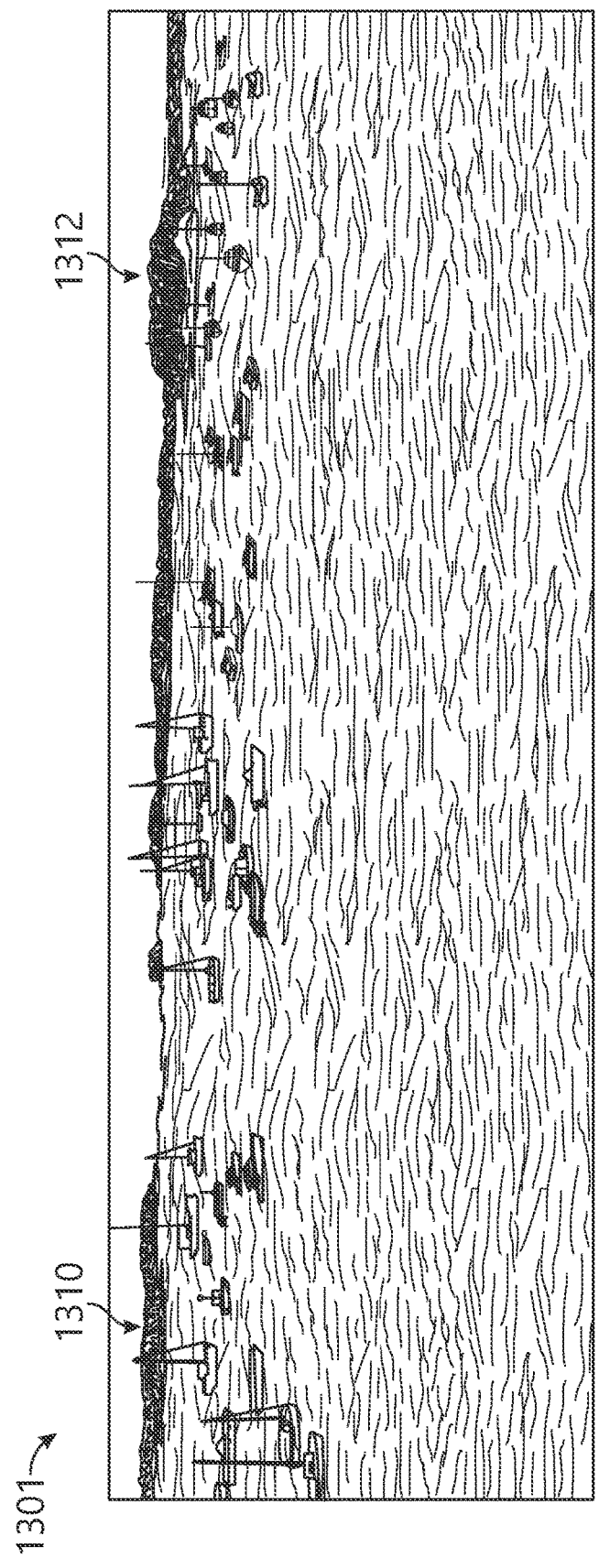

FIGS. 13A-B illustrate benefits provided by viewpoint elevated images for use in sensor fusion for navigational systems in accordance with an embodiment of the disclosure. As shown in image 1300, in which the view from sea level, boats are obstructing each other, and it is difficult to determine which island 1310, 1312, is behind which. Image 1301 of FIG. 13B shows the same scene with elevated viewpoint, and boats and islands 1310, 1312 have clear distance separation. Embodiments of the present disclosure provide techniques for use with mechanical or synthetic viewpoint elevation to increase the situational awareness of a user of mobile structure 101. Problems that are addressed include: giving a better sense of depth and perspective, finding a place to mount a camera with unobstructed viewpoint, giving a better aspect ratio to an otherwise long thin horizon, making use of the improved perspective for augmented reality displays, creating a camera architecture enabling a raised viewpoint, finding or creating an unobstructed viewpoint to compensate for viewpoints from the deck of a ship that are often obstructed in some way by railings, wires, masts, antennas and so forth.

The most direct way to raise the viewpoint is to raise the imaging module/camera mounting point. Fixing a camera to the mast of a sailing yacht, or on a raised pole on a power boat requires: a light weight design with minimal moving parts and minimal cross section; that multiple camera images are taken down the mast on a single network (such as Ethernet or WiFi) and that multiple camera do not involve multiple cables; that servicing requirements are minimized; that motion stabilization be catered to if required. One architecture that addresses all these problems includes: imaging modules and OPSs providing images and sensor data to an image stabilizer (e.g., that receives a yaw, pitch, and roll of mobile structure 101 over a wired or wireless communication link), the image stabilizer providing stabilized images to a foreground obstruction remover, the foreground obstruction remover providing unobstructed stabilized images to an image stitcher (e.g., to increase the effective FOV), and the image stitcher proving images to a video analytics process to derive information from the images and/or to generate further images and/or charts augmented with navigation data from navigation sensors and/or derived from the processed images. In various embodiments, the elements of the architecture may be powered by power over Ethernet links and/or using autonomous power (e.g., solar, batter, and/or combinations of such).

Imaging modules may be housed in a module which can fit on top of an existing masthead lighting stack, or on a pole (e.g., for powerboats). For example, a two camera solution with each camera having a 90° horizontal field of view would yield an image system with a 180° field of view. A four camera version would give all round vision. Given the miniaturization of cameras for portable devices (mobile phones), such a camera array could be as small as 4 cm in diameter and 4 cm in height.

Figure 14A:
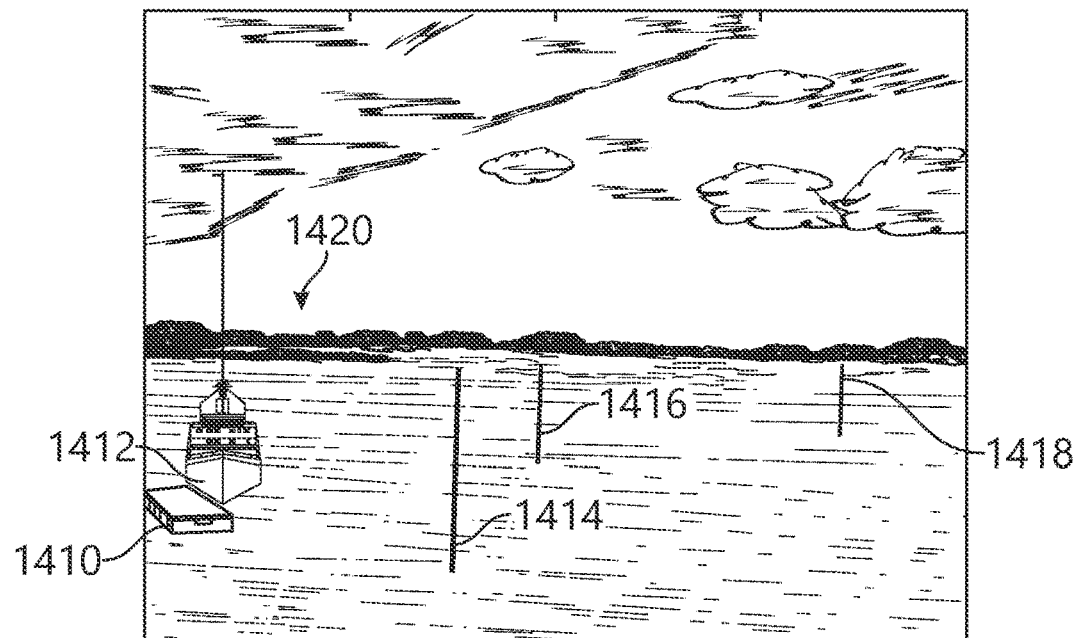
FIGS. 14A-B illustrate image processing steps to generate a synthetic elevated viewpoint image for use in sensor fusion for navigational systems in accordance with an embodiment of the disclosure.
Figure 14B:
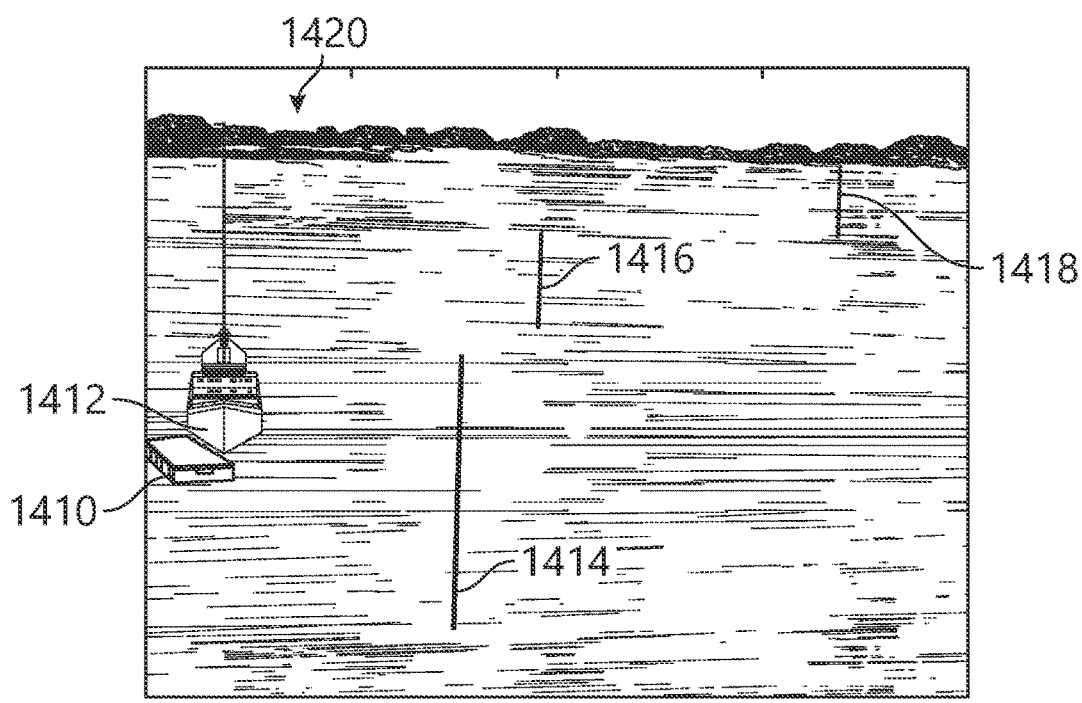

As an alternative, or in addition, to physically raising the camera viewpoint, the viewpoint can be raised synthetically through image processing. This is particularly useful for power boats where mounting height is typically limited to a radar arch or fly bridge. For example, FIGS. 14A-B illustrate image processing steps to generate a synthetic elevated viewpoint image for use in sensor fusion for navigational systems in accordance with an embodiment of the disclosure. View point 1400 of FIG. 14A has been synthetically elevated to provide synthetic viewpoint 1401 of FIG. 14B.

The benefits of raising the view point are: better distinction of distances (e.g. coastal spit 1420 top left, or channel markers/posts 1414, 1416, 1418), improved aspect ratio (e.g., a sea scene tends to be wide and thin, for example 90° horizontally and 20° vertically), more sea on which to annotate (e.g., helpful for augmented/virtual reality sensor fusion). The algorithm which created this image may include: identifying objects in the image, such as boat 1412, dock 1410, and posts 1414, 1416, 1418 (this can be done automatically), making copies of the objects, stretching the image vertically (in this case by a factor of two, to double the apparent elevation), pasting the stored objects back onto the image, with their lowest contact points with the water as the reference point, backfilling above the pasted objects (in this case the because of the doubling, there is a need to backfill up to double the height as the height of the original object), using pixels from the left and right of the backfill area to recreate or simulate the water or the scene behind.

For example, controller 130 may be configured to generate synthetic viewpoint elevated image 1401 corresponding to horizon-stabilized image 1400 by identifying object pixels and a water contact reference pixel position corresponding to a detected object (e.g., boat 1412, post 1414) in horizon-stabilized image 1400, storing the object pixels and water contact reference pixel position, generating a vertically stretched image from horizon-stabilized image 1400, copying the identified object pixels into the vertically stretched image according to the water contact reference pixel position, and removing any remaining stretched object pixels from the vertically stretched image (e.g., by backfill and/or other methods) to generate synthetic viewpoint elevated image 1401.

In alternative embodiments, controller 130 may be configured to generate synthetic viewpoint elevated image 1401 corresponding to horizon-stabilized image 1400 by identifying object pixels and a water contact reference pixel position corresponding to a detected object (e.g., boat 1412, post 1414) in horizon-stabilized image 1400, removing the identified object pixels from horizon-stabilized image 1400, backfilling the unpopulated pixel locations corresponding to the removed object pixels, generating a vertically stretched image from horizon-stabilized image 1400, and copying the identified object pixels into the vertically stretched image according to the water contact reference pixel position to generate synthetic viewpoint elevated image 1401. In various embodiments, such backfilling may include interpolation based on nearest populated pixels, pixel or pixel area doubling, and/or other methods. Furthermore, generating a vertically stretched image may include line doubling, backfilling, interpolation methods, and/or other methods.

Figure 15:
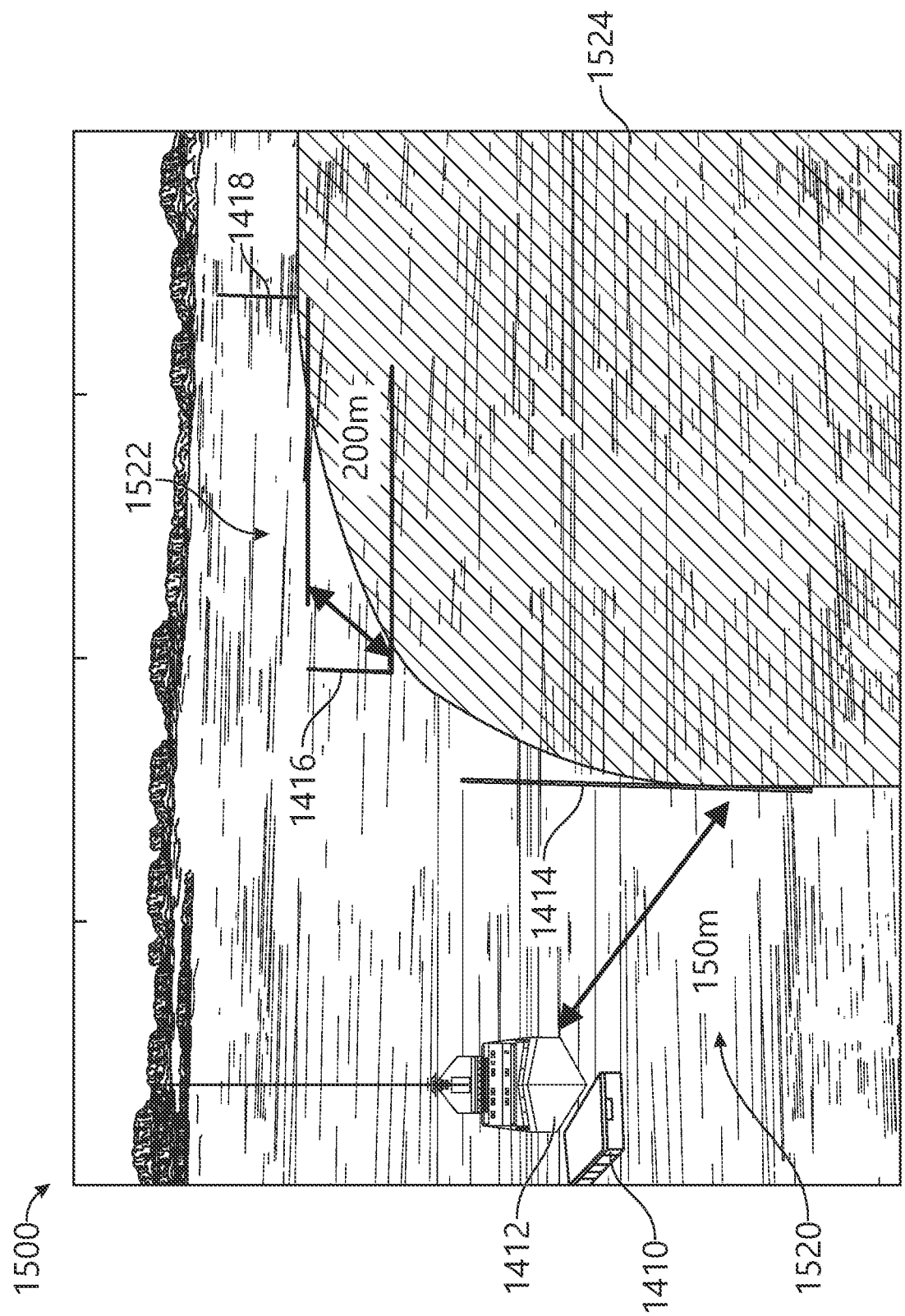
FIG. 15 illustrates an image augmented with navigational data using sensor fusion for navigational systems in accordance with an embodiment of the disclosure.

One of the benefits of an elevated viewpoint is the ability to add information to an image or video. For example, FIGS. 5 and 15 illustrate images augmented with navigational data using sensor fusion for navigational systems in accordance with embodiments of the disclosure. In some embodiments, bathometric data may be overlaid onto image 1401, so that the real depths of the channel are superimposed and provided to a user. Posts 1414, 1416, 1418 are planted in mud, and some posts have more water under them than others; a boat's navigation system knows the keel depth, the water depth (sonar or chart data), the current state of tide, and so the water in image 1401 may be tinted darker in no go areas, for example. For example, in augmented image 1500 (an augmented version of synthetic viewpoint elevated image 1401 of FIG. 14B), distance indicators 1520 and 1522 have been added so as to have a perspective roughly following the surface of the water in their respective areas. Moreover, shaded/hatched area 1524 has been added to indicate an area too shallow to traverse. In FIG. 5, AIS data and a distance indicator has been added to the image.

In some embodiments, sonar fusion systems incorporating imaging modules and navigational sensors may be configured to provide additional details about objects in a vicinity of mobile structure 101. For example, distances to objects can be estimated by having two separated cameras. Human eyes are good at distance estimation for close objects, but human 8 cm eye separation implies that objects further than 4.5 m subtend less than 1°, and so distance estimation becomes difficult. This can be improved for marine systems by separating the cameras to boat scale. For example, cameras 3 m apart (e.g., along a lateral axis of mobile structure 101) can resolve objects 170 m away to 1°.

To obtain even better distance estimation a single moving camera can be used. For example, a boat travelling at 6 knots moves 3 meters in a second, so in 10 s, it has travelled 30 m. An object 1.7 km abeam then shifts by 1° in 10 s. Similarly, objects ahead shift due to boat roll and due to small deviations in heading. The boat has multiple sensors (attitude, heading, boat speed through the water, SOG, COG, inertial sensors, etc.) and these can all contribute to an accurate picture of camera motion. The user can enter the camera's height above the roll center, or this can be determined automatically by tracking camera accelerometer data against boat roll/pitch.

For example, controller 130 may be configured to identify a first pixel position and a first pixel area of an object detected in a first horizon-stabilized image, identify a second pixel position and a second pixel area of the object in a second horizon-stabilized image, wherein a first position of the imaging module corresponding to the first horizon-stabilized image is different from a second position of the imaging module corresponding to the second horizon-stabilized image, and determine an estimated range to, velocity of, and/or relative position of the object based, at least in part, on the first and second pixel positions, pixel areas, and positions of the imaging module. In some embodiments, the estimate velocity may correspond to a tangential velocity of the object relative to a heading of mobile structure 101.

For docking, it is useful to be able to generate a detailed three dimensional point cloud of the pontoon and boat geometry around. In a marine environment, it's the navigation systems on board which provide camera position and orientation data, and the boat's pitching & rolling can cause significant camera motion which needs to be included in the camera position and orientation estimate. For example, in some embodiments, controller 130 may be configured to identify a first plurality of pixel positions and pixel areas corresponding to a plurality of features of an object detected in a first horizon-stabilized image, identify a second plurality of pixel positions and pixel areas corresponding to the plurality of features of the object in a second horizon-stabilized image, wherein a first position of the imaging module corresponding to the first horizon-stabilized image is different from a second position of the imaging module corresponding to the second horizon-stabilized image, and generate a three dimensional point cloud model of the object based, at least in part, on the first and second pluralities of pixel positions and pixel areas and the first and second positions of the imaging module.

Obstructions such as radio antennas, rigging etc. often mask sections of an image and these masks can be removed with backfilling. A backfilling algorithm is summarized as follows: average many image frames (ensuring a dispersion of roll pitch and yaw angles) so that the "moving" background averages to grey; pick the foreground and create an image map (call this the boat structure); in each image frame, replace the foreground structure pixels by transparent pixels; from the orientation data associated with each image frame, move the previously rendered image to a position consistent with the current camera viewing orientation; paint the new image on top, ensuring transparent pixels do not overwrite existing pixels.

Figure 16A:
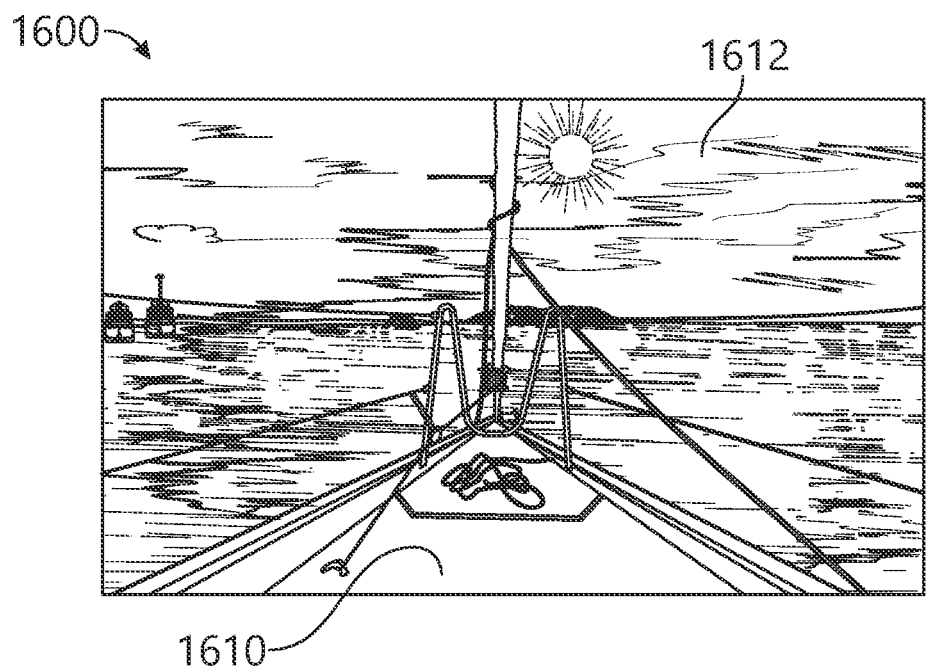
FIGS. 16A-B illustrate image processing steps to remove foreground obstructions from an image for use in sensor fusion for navigational systems in accordance with an embodiment of the disclosure.
Figure 16B:
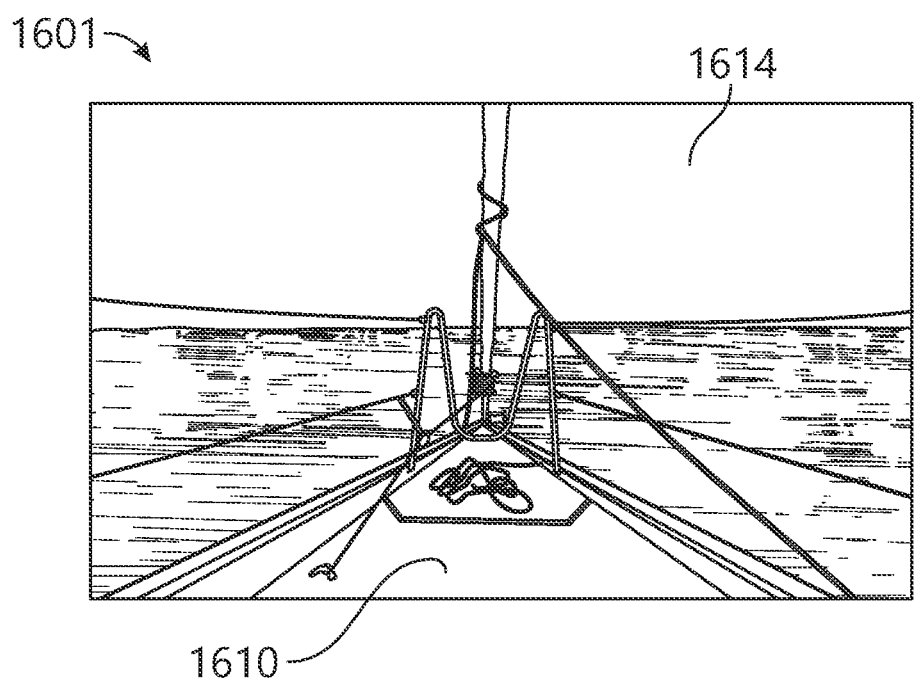

FIGS. 16A-B illustrate image processing steps to remove foreground obstructions from an image for use in sensor fusion for navigational systems in accordance with an embodiment of the disclosure. For example, controller 130 may be configured to synthetically remove foreground obstructions in a received image by generating a background averaged frame by averaging a plurality of images received prior to the received image, identifying foreground pixels in the background averaged frame, selecting one of the prior received images to provide background pixels corresponding to the foreground pixels in the at least one image, based on orientation, position, and/or navigational data corresponding to the one of the prior received images and the received image, and replacing the foreground pixels in the received image with the background pixels from the selected one of the prior received images. More generally, controller 130 may be configured to synthetically remove foreground obstructions in a received image by identifying foreground pixels in the at least one received image based on at least two images received prior to the at least one received image, selecting a prior received image (e.g., a backfill image) to provide background pixels corresponding to the foreground pixels in the at least one received image, based on orientation, position, and/or navigational data corresponding to the prior received image and the at least one received image, and replacing the foreground pixels in the at least one received image with the background pixels from the selected prior received images.

For example, controller 130 may be configured to detect foreground pixels in two images differentiated by different positions and/or orientations of the imaging module by identifying common structures with the same pixel locations in the two images. The backfill image may be one of the two prior images used to identify the foreground pixels, for example, or may be a different prior received image, selected such that its background pixels substantially spatially overlap (e.g., the an absolute coordinate frame) with the foreground pixels of the current received image.

Marine navigation systems typically include chart plotters, radars, AIS receivers and other instruments. Recently cameras and infra-red cameras have been added, but integrating cameras into the systems is proving challenging. This is because cameras produce images whereas AIS and navigation charts are databases of objects. In various embodiments, images may be stabilized and obstructions removed, as described herein. Such "clean" camera images can be integrated with a marine navigation system so that objects on the image are correlated to objects in a chart, the AIS data, etc. For example, bathymetric data can be converted to go/no go zones which can be provided as an overlay on a stabilized, viewpoint elevated, and/or obstruction removal-processed image. Embodiments provide solutions for object recognition, correction of GPS random walk errors, accommodation of AIS latency and position error, accommodation of radar directional error, and fusion of databases from multiple sensors into a single object database.

Figure 17:
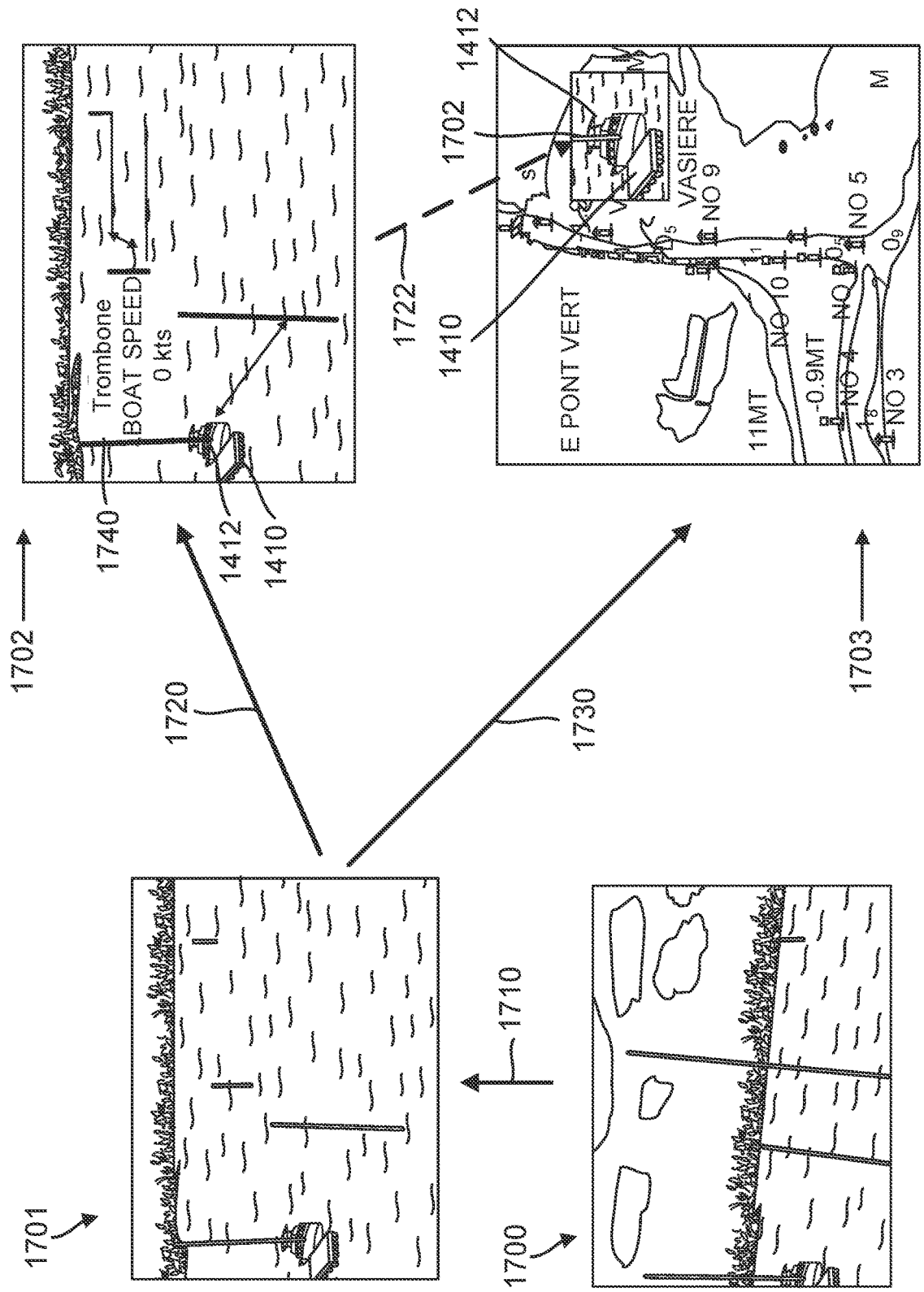
FIG. 17 illustrates image processing steps to generate images and/or charts augmented with navigational data using sensor fusion for navigational systems in accordance with an embodiment of the disclosure.

Embodiments of the present disclosure can implement processing steps to integrate visible or thermal images into a marine navigation system, for use with augmented reality or watercraft automation, as described herein. For example, FIG. 17 illustrates image processing steps to generate images and/or charts augmented with navigational data using sensor fusion for navigational systems in accordance with an embodiment of the disclosure. Image 1700 is stabilized and/or viewpoint elevated by process 1710 to generate image 1701. Image 1701 is augmented by process 1730 to create image 1703. To achieve this, the position of boat 1412 has been determined by: estimating its range (distance in pixels down from the horizon, converted to distance based on camera mounting height above sea level), estimating its bearing based on the camera pan angle and ship's heading, and converting range and bearing to Cartesian coordinates and adding to the camera's latitude and longitude.

In image 1702 generated from image 1702 by process 1720, an AIS database (e.g., a navigation database) has been interrogated to determine the closest matching vessel, and the vessel's name and speed have been annotated accordingly as overlay information 1740, and the bathymetric data has been compared to keel depth and tidal height to paint the navigable channel onto the image, as shown (similar to that shown in FIG. 15). In image 1703, the viewing position has been added to the chart, and boat 1412 and dock 1410 (not originally charted) have been added to the chart based on their position as derived from images 1701 and/or 1702.

A general algorithm structure corresponding to FIG. 17 may be as follows: provide relative coordinates of detected objects in images and/or other navigational data, along with a position, speed over ground, and/or course over ground of mobile structure 101, to a coordinate frame transformer to derive absolute positions for the detected objects; provide the derived absolute object positions and corresponding AIS, chart, and/or otherwise provided cataloged absolute object positions to an object matching and sensor fusion process (e.g., which matches detected objects to cataloged objects based on the derived and cataloged positions, and which adjusts, refines, and/or aligns the derived and/or cataloged positions to each other through sensor fusion and aggregation of multiple types of object detection for each object) to generate an object database, and then use the object database (e.g., a navigational database) to generate augmented reality image renderings (e.g., image 1702) and/or to help provide for autopiloting of mobile structure 101 (e.g., by updating object positions and, for example piloting around obstacles, shallows, or unsafe conditions).

The principle process steps for generating the object database (e.g., mapping objects to metadata assignment) may include: object detection, object recognition, and object identification. Object detection may include producing a database of sea surface objects and/or non-sea-surface objects referenced to imaging module direction to North & frame elevation to horizon, including object characteristics such as: azimuth relative to image frame, relative distance (from imaging module/mobile structure), relative velocity tangential & error bound, relative velocity radial & error bound, and dimensioned bit image (H or V reference).

Object detection may be performed in the camera to make processing scalable (e.g., such that adding cameras does not increase processing load on display). Everything above the horizon may be considered to be an object. For relative distance, the initial relative distance estimate for the objects is computed using triangulation from a known camera mounting height. Height may be a user parameter, or may be determined from accelerometer/gyro data comparison. However, in the best fit process, one of the estimation states will be camera height, so the height does not need to be known to a high degree of accuracy. Consider a camera mounted at height H above sea level and having vertical field of view V, and P pixels vertically. If the camera images some object p pixels below the horizon, the distance estimate is $H/\tan(V \cdot p/P)$.

Object recognition may broadly characterize/segregate objects into predetermined types (e.g., boat, channel marker, etc.) based, at least in part, on the object characteristics determined in conjunction with object detection. Object identification may integrate with other navigational databases to accurately identify each object and resolve conflicts and errors through the combining process, such as GPS random walk correction, AIS latency correction, Radar azimuth error correction, and/or other navigational data correction. One combining process may be implemented as a best fit to a collection of objects across space and time to take out small errors such as heading accuracy errors. For a cluttered scene, the best fit process can be configured to focus on ideal objects (the 'king pin' or 'easy ones') like channel marks or lighthouses. Errors typically arise from constant errors (such as heading deviation) and system noise, so the constant errors should be recognizable and can be corrected. The best fit process can be implemented as a least squares optimization adjustment. In some embodiments, the other navigational databases may include data indicative of shops, restaurants, chandleries etc., which can be bannered or highlighted in rendered augmented images, and commercial revenues can be transacted between business partners.

In additional embodiments, some object may remain unidentified after the object detection, recognition, and identification processes. For man overboard and other unidentified objects, the system can automatically record and track positions, and the display can zoom/center on the object. Alert through AIS MOB objects can be then automatic, via synthetic AIS transmissions/signatures or automated VHF mayday alerts. Submerged containers are another example of objects of general public interest and their positions could be made public in a similar way. For example, controller 130 may be configured to generate a synthetic AIS signature for at least one unidentified object, wherein the synthetic AIS signature comprises at least one object characteristic corresponding to the at least one unidentified object, such as a position, speed, depth, and/or other object characteristic, as described herein.

Figure 18:
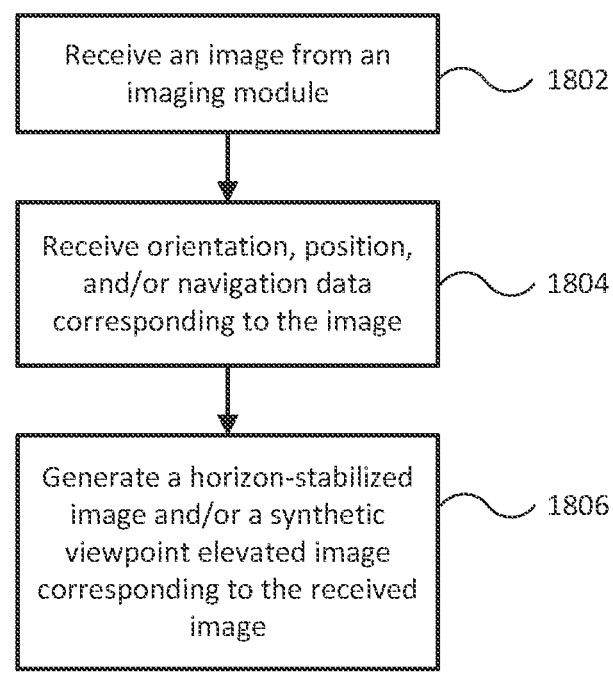
FIG. 18 illustrates a flowchart of a process for video based sensor fusion for navigational systems in accordance with an embodiment of the disclosure.

FIG. 18 illustrates a flowchart of a process for video based sensor fusion for navigational systems in accordance with an embodiment of the disclosure. It should be appreciated that any step, sub-step, sub-process, or block of process 1800 may be performed in an order or arrangement different from the embodiments illustrated by FIG. 18. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1800 is described with reference to systems, process, and images described in reference to FIGS. 1-17, process 1800 may be performed by other systems different from those systems, process, and images and including a different selection of electronic devices, sensors, assemblies, mobile structures, and/or mobile structure attributes, for example.

In block 1802, an image from an imaging module is received. For example, controller 130 may be configured to receive one or more visible spectrum images from visible spectrum imaging module 223 and/or one or more infrared images from infrared imaging module 224. In some embodiments, controller 130 may be configured to combine the visible spectrum image and the infrared image, such as to provide a combined image with characteristics from each type of image (e.g., high spatial frequency content from the visible spectrum image, and thermal/radiometric infrared content from the infrared image, so as to produce a thermal image with more easily recognizable image detail), and then deliver the combined image to block 1804.

In block 1804, orientation, position, and/or navigation data is received. For example, controller 130 may be configured to receive orientation, position, and/or navigation data corresponding to the image received in block 1802, from OPS 225 and/or any of a plurality of different navigational sensors, as described herein. In some embodiments, the imaging module generating the image may include OPS 225 and controller 130 may be configured to receive the image and orientation and/or position data corresponding to the imaging module and the image. In other embodiments, controller 130 may be configured to receive orientation, position, and/or navigation data from sensors separate from the imaging module and to determine an orientation and/or position of the imaging module based on the orientation, position, and/or navigation data corresponding to mobile structure 101 and/or other elements of mobile structure 101.

In block 1806, a horizon-stabilized image and/or a synthetic viewpoint elevated image is generated. For example, controller 130 may be configured to generate a horizon-stabilized image and/or a synthetic viewpoint elevated image corresponding to the image received in block 1802 based, at least in part, on the orientation, position, and/or navigation data received in block 1804.

In some embodiments, controller 130 may be configured to generate a horizon-stabilized image by determining a slant and elevation of the imaging module corresponding to the at least one received image based, at least in part, on the received orientation, position, and/or navigation data, and/or the at least one received image (e.g., image processing performed on the at least one received image), rotating pixels of the at least one received image (e.g., about a center of the received image and/or other portions of the received image or points outside the bounds of the received image) to at least partially compensate for the determined slant, translating the pixels of the at least one received image (e.g., vertically, horizontally, and/or any combination of those) to at least partially compensate for the determined elevation, and cropping the rotated and translated at least one received image symmetrically about a reference slant and/or a reference elevation to compensate for an expected extent of motion of the mobile structure and/or to remove unpopulated pixel locations generated by the rotating and translating the at least one received image.

To reduce or damp jitter in an image stream, controller 130 may be configured to generate left and right pixel intensity profiles corresponding to respective left-of-center and right-of-center vertical strips of pixels of the rotated and translated at least one received image, compare the left and right pixel intensity profiles to prior left and right pixel intensity profiles generated from a prior received image to determine a vertical jitter damping adjustment, and translate the pixels of the at least one received image vertically according to the determined a vertical jitter damping adjustment, prior to the cropping the at least one received image. More generally, controller 130 may be configured to generate one or more pixel intensity profiles corresponding to one or more features (e.g., areas within an image, detected edges, and/or other image features) of the at least one received image and/or the rotated and translated at least one received image, comparing the one or more pixel intensity profiles to one or more prior pixel intensity profiles generated from a prior received image and/or a prior rotated and translated received image to determine a vertical jitter damping adjustment, and adjusting the rotating and/or translating the pixels of the at least one received image according to the determined vertical jitter damping adjustment, prior to the cropping the at least one received image. In some embodiments, the adjusting the rotating and/or translating may include adjusting the determined slant and/or elevation, and/or adjusting the rotating and/or translating before performing or completing the rotating and/or transforming.

To compensate for images that would otherwise be cropped too much to provide sufficient information to a user, controller 130 may be configured to detect that the determined elevation of the imaging module is outside a predetermined allowable range of elevations (e.g., predetermined based on characteristics of the vessel, a manufacturer setting, or a user-supplied setting), retrieve valid pixels from a prior horizon-stabilized image corresponding to a prior determined elevation of the imaging module being substantially within the predetermined allowable range of elevations, and copy the retrieved valid pixels into corresponding unpopulated pixel locations in the rotated and translated at least one received image, prior to the cropping the at least one received image.

In various embodiments, controller 130 may be configured to generate a synthetic viewpoint elevated image corresponding to the received image by identifying object pixels and a water contact reference pixel position corresponding to a detected object in the received image, generating a vertically stretched image from the received image, copying the identified object pixels into the vertically stretched image according to the water contact reference pixel position, and removing any remaining stretched object pixels from the vertically stretched image to generate the synthetic viewpoint elevated image. In some embodiments, the synthetic viewpoint elevated image may be generated based on a horizon-stabilized image. In alternative embodiments, controller 130 may be configured to generate a synthetic viewpoint elevated image by identifying object pixels and a water contact reference pixel position corresponding to a detected object in the at least one horizon-stabilized image, removing the identified object pixels from the at least one horizon-stabilized image, backfilling the unpopulated pixel locations corresponding to the removed object pixels, generating a vertically stretched image from the at least one horizon-stabilized image, and copying the identified object pixels into the vertically stretched image according to the water contact reference pixel position to generate the synthetic viewpoint elevated image.

In additional embodiments, controller 130 may be configured to synthetically remove foreground obstructions in the received image, before generating the at least one horizon-stabilized image or the synthetic viewpoint elevated image. For example, controller 130 may be configured to generate a background averaged frame by averaging a plurality of images received prior to the received image, identify foreground pixels in the background averaged frame, select one of the prior received images to provide background pixels corresponding to the foreground pixels in the received image, based on orientation, position, and/or navigational data corresponding to the one of the prior received images and the received image, and replace the foreground pixels in the received image with the background pixels from the selected one of the prior received images. Controller 130 may also be configured to synthetically remove foreground obstructions in a received image by identifying foreground pixels in the at least one received image based on at least two images received prior to the at least one received image, selecting a prior received image to provide background pixels corresponding to the foreground pixels in the at least one received image, based on orientation, position, and/or navigational data corresponding to the prior received image and the at least one received image, and replacing the foreground pixels in the at least one received image with the background pixels from the selected prior received images.

In further embodiments, controller 130 may be configured to determine a distance to and/or a relative position of an object detected within the received image. For example, controller 130 may be configured to identify a first pixel position and a first pixel area of an object detected in a first one of a plurality of horizon-stabilized images, identify a second pixel position and a second pixel area of the object in a second one of the plurality of horizon-stabilized images, wherein a first position of the imaging module corresponding to the first horizon-stabilized image is different from a second position of the imaging module corresponding to the second horizon-stabilized image, and determine an estimated range to, tangential velocity of, and/or relative position of the object based, at least in part, on the first and second pixel positions, pixel areas, and positions of the imaging module.

Controller 130 may also be configured to generate a three dimensional point cloud model of a detected object, such as for use when docking safely. Controller 130 may be configured to identify a first plurality of pixel positions and pixel areas corresponding to a plurality of features of an object detected in a first one of a plurality of horizon-stabilized images, identify a second plurality of pixel positions and pixel areas corresponding to the plurality of features of the object in a second one of the plurality of received images, wherein a first position of the imaging module corresponding to the first horizon-stabilized image is different from a second position of the imaging module corresponding to the second horizon-stabilized image, and generate a three dimensional point cloud model of the object based, at least in part, on the first and second pluralities of pixel positions and pixel areas and the first and second positions of the imaging module. In various embodiments, such processing may be performed on horizon-stabilized images and/or synthetic viewpoint elevated images, as described herein.

Once the images are received and/or processed, controller 130 may be configured to combine navigational data with the images to produce augmented reality views and/or other sensor fusion views, as described herein. For example, controller 130 may be configured to combine at least a portion of the navigational data received in block 1804 with a horizon-stabilized image or a synthetic viewpoint elevated image to produce a combined image, and render the combined image on a display of a user interface of the mobile structure. The combined image may include the horizon-stabilized image or the synthetic viewpoint elevated image overlaid with object identification information, channel depth information, distance measurement information, object course and/or speed information, and/or other navigational information corresponding to the mobile structure or a detected object, for example, or a navigational chart comprising navigational data derived, at least in part, from the horizon-stabilized image or the synthetic viewpoint elevated image.

In another example, controller 130 may be configured to detect one or more objects in a plurality of horizon-stabilized images and/or the received navigational data, determine a relative and/or absolute position, orientation, and/or velocity, a size, a depth, an altitude, and/or other object characteristics of each of the detected objects based, at least in part, on the plurality of horizon-stabilized images and/or the received navigational data, segregate the detected objects into predetermined types based, at least in part, on the determined object characteristics, identify one or more of the objects based, at least in part, on a navigational database (e.g., a predetermined navigational database, such as a chart or listing, and/or a updating navigational database, such as one including received AIS data), and/or generate a synthetic Automatic Identification System (AIS) signature for at least one unidentified object, wherein the synthetic AIS signature comprises at least one object characteristic corresponding to the at least one unidentified object.

It is contemplated that any one or combination of methods to provide augmented reality sonar imagery may be performed according to one or more operating contexts of a control loop, for example, such as a startup, learning, running, and/or other type operating context. For example, process 1800 may proceed back to block 1802 and proceed through process 1800 again to produce and updated navigational database and/or integrated model, as in a control loop.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An apparatus comprising:
a logic device configured to communicate with a plurality of navigational sensors, at least one orientation and/or position sensor (OPS), and an imaging module coupled to a mobile structure, wherein each navigational sensor is configured to provide navigational data associated with the mobile structure, and wherein the logic device is configured to:
receive at least one image from the imaging module;
receive orientation, position, and/or navigation data corresponding to the at least one image from the OPS and the plurality of navigational sensors; and
generate at least one horizon-stabilized image corresponding to the received at least one image based, at least in part, on the received orientation, position, and navigation data and the received at least one image;
wherein the generating the at least one horizon-stabilized image comprises:
generating one or more pixel intensity profiles corresponding to one or more features of the at least one received image;
comparing the one or more pixel intensity profiles to one or more prior pixel intensity profiles generated from a prior received image to determine a vertical jitter damping adjustment; and
adjusting positioning of pixels within the at least one received image according to the determined vertical jitter damping adjustment.

2. The apparatus of claim 1, wherein the generating the at least one horizon-stabilized image comprises:
determining a slant and elevation of the imaging module corresponding to the at least one received image based, at least in part, on the received orientation, position, and/or navigation data and/or the at least one received image;
rotating pixels of the at least one received image to at least partially compensate for the determined slant;
translating the pixels of the at least one received image to at least partially compensate for the determined elevation; and
cropping the rotated and translated at least one received image symmetrically about a reference slant and/or a reference elevation to compensate for an expected extent of motion of the mobile structure.

3. The apparatus of claim 2, wherein the generating the at least one horizon-stabilized image comprises:
detecting that the determined elevation of the imaging module is outside a predetermined allowable range of elevations;
retrieving valid pixels from a prior horizon-stabilized image corresponding to a prior determined elevation of the imaging module being substantially within the predetermined allowable range of elevations; and
copying the retrieved valid pixels into corresponding unpopulated pixel locations in the rotated and translated at least one received image, prior to the cropping the at least one received image.

4. The apparatus of claim 1, wherein the logic device is configured to generate a synthetic viewpoint elevated image corresponding to the at least one horizon-stabilized image by:
identifying object pixels and a water contact reference pixel position corresponding to a detected object in the at least one horizon-stabilized image;
removing the identified object pixels from the at least one horizon-stabilized image;
backfilling unpopulated pixel locations corresponding to the removed object pixels;
generating a vertically stretched image from the at least one horizon-stabilized image; and
copying the identified object pixels into the vertically stretched image according to the water contact reference pixel position to generate the synthetic viewpoint elevated image.

5. The apparatus of claim 1, wherein the at least one horizon-stabilized image comprises a plurality of horizon-stabilized images, and wherein the logic device is configured to:
identify a first pixel position and a first pixel area of an object detected in a first one of the plurality of horizon-stabilized images;
identify a second pixel position and a second pixel area of the object in a second one of the plurality of horizon-stabilized images, wherein a first position of the imaging module corresponding to the first horizon-stabilized image is different from a second position of the imaging module corresponding to the second horizon-stabilized image; and determine an estimated range to the object, an estimated velocity of the object, and/or an estimated relative position of the object based, at least in part, on the first and second pixel positions, pixel areas, and positions of the imaging module.

6. The apparatus of claim 1, wherein the at least one horizon-stabilized image comprises a plurality of horizon-stabilized images, and wherein the logic device is configured to:

identify a first plurality of pixel positions and pixel areas corresponding to a plurality of features of an object detected in a first one of the plurality of horizon-stabilized images;

identify a second plurality of pixel positions and pixel areas corresponding to the plurality of features of the object in a second one of the plurality of horizon-stabilized images, wherein a first position of the imaging module corresponding to the first horizon-stabilized image is different from a second position of the imaging module corresponding to the second horizon-stabilized image; and generate a three dimensional point cloud model of the object based, at least in part, on the first and second pluralities of pixel positions and pixel areas and the first and second positions of the imaging module.

7. The apparatus of claim 1, further comprising the imaging module and the OPS, wherein the imaging module is coupled to the mobile structure by an active or passive mechanically horizon-stabilized mount, wherein the mobile structure comprises a watercraft, and wherein the logic device is configured to:

combine at least a portion of the navigational data with the at least one horizon-stabilized image or a synthetic viewpoint elevated image derived from the at least one horizon-stabilized image to produce a combined image; and render the combined image on a display of a user interface of the mobile structure, wherein the combined image comprises:

the at least one horizon-stabilized image or the synthetic viewpoint elevated image overlaid with navigational information corresponding to the mobile structure or a detected object; or a navigational chart comprising navigational data derived, at least in part, from the at least one horizon-stabilized image or the synthetic viewpoint elevated image.

8. The apparatus of claim 1, wherein the at least one horizon-stabilized image comprises a plurality of horizon-stabilized images, and wherein the logic device is configured to:

detect one or more objects in the plurality of horizon-stabilized images and/or the received navigational data;

determine one or more object characteristics of each of the detected objects based, at least in part, on the plurality of horizon-stabilized images and/or the received navigational data;

segregate the detected objects into predetermined types based, at least in part, on the determined object characteristics;

identify one or more of the objects based, at least in part, on a navigational database; and generate a synthetic Automatic Identification System (AIS) signature for at least one unidentified object, wherein the synthetic AIS signature comprises at least one object characteristic corresponding to the at least one unidentified object.

9. An apparatus comprising:

a logic device configured to communicate with a plurality of navigational sensors, at least one orientation and/or position sensor (OPS), and an imaging module coupled to a mobile structure, wherein each navigational sensor is configured to provide navigational data associated with the mobile structure, and wherein the logic device is configured to:

receive at least one image from the imaging module;

receive orientation, position, and/or navigation data corresponding to the at least one image from the OPS and the plurality of navigational sensors; and generate at least one horizon-stabilized image corresponding to the received at least one image based, at least in part, on the received orientation, position, and navigation data and the received at least one image;

wherein the logic device is configured to synthetically remove foreground obstructions in the at least one received image, before generating the at least one horizon-stabilized image, by:

identifying foreground pixels in the at least one received image based on at least two images received prior to the at least one received image;

selecting a prior received image to provide background pixels corresponding to the foreground pixels in the at least one received image, based on orientation, position, and/or navigational data corresponding to the prior received image and the at least one received image; and replacing the foreground pixels in the at least one received image with the background pixels from the selected prior received image.

10. A method comprising:

receiving at least one image from an imaging module coupled to a mobile structure;

receiving orientation, position, and/or navigation data corresponding to the at least one image from an orientation and/or position sensor (OPS) and a plurality of navigational sensors, wherein each navigational sensor is configured to provide navigational data associated with the mobile structure; and generating at least one horizon-stabilized image corresponding to the received at least one image based, at least in part, on the received orientation, position, and navigation data and the received at least one image;

wherein the generating the at least one horizon-stabilized image comprises:

detecting an elevation of the imaging module is outside a predetermined allowable range of elevations;

retrieving valid pixels from a prior horizon-stabilized image corresponding to a prior determined elevation of the imaging module being substantially within the predetermined allowable range of elevations; and copying the retrieved valid pixels into corresponding unpopulated pixel locations in the at least one received image.

11. The method of claim 10, wherein the generating the at least one horizon-stabilized image comprises:

determining a slant and elevation of the imaging module corresponding to the at least one received image based, at least in part, on the received orientation, position, and/or navigation data and/or the at least one received image;

rotating pixels of the at least one received image to at least partially compensate for the determined slant;

translating the pixels of the at least one received image to at least partially compensate for the determined elevation; and cropping the rotated and translated at least one received image symmetrically about a reference slant and/or a reference elevation to compensate for an expected extent of motion of the mobile structure.

12. The method of claim 11, wherein the generating the at least one horizon-stabilized image comprises:

generating one or more pixel intensity profiles corresponding to one or more features of the at least one received image and/or the rotated and translated at least one received image;

comparing the one or more pixel intensity profiles to one or more prior pixel intensity profiles generated from a prior received image and/or a prior rotated and translated received image to determine a vertical jitter damping adjustment; and adjusting the rotating and/or translating the pixels of the at least one received image according to the determined vertical jitter damping adjustment.

13. The method of claim 10, further comprising generating a synthetic viewpoint elevated image corresponding to the at least one horizon-stabilized image by:

identifying object pixels and a water contact reference pixel position corresponding to a detected object in the at least one horizon-stabilized image;

removing the identified object pixels from the at least one horizon-stabilized image;

backfilling unpopulated pixel locations corresponding to the removed object pixels;

generating a vertically stretched image from the at least one horizon-stabilized image; and copying the identified object pixels into the vertically stretched image according to the water contact reference pixel position to generate the synthetic viewpoint elevated image.

14. The method of claim 10, further comprising synthetically removing foreground obstructions in the at least one received image, before generating the at least one horizon-stabilized image, by:

identifying foreground pixels in the at least one received image based on at least two images received prior to the at least one received image;

selecting a prior received image to provide background pixels corresponding to the foreground pixels in the at least one received image, based on orientation, position, and/or navigational data corresponding to the prior received image and the at least one received image; and replacing the foreground pixels in the at least one received image with the background pixels from the selected prior received image.

15. The method of claim 10, wherein the at least one horizon-stabilized image comprises a plurality of horizon-stabilized images, the method further comprising:

identifying a first pixel position and a first pixel area of an object detected in a first one of the plurality of horizon-stabilized images;

identifying a second pixel position and a second pixel area of the object in a second one of the plurality of horizon-stabilized images, wherein a first position of the imaging module corresponding to the first horizon-stabilized image is different from a second position of the imaging module corresponding to the second horizon-stabilized image; and determining an estimated range to the object, an estimated velocity of the object, and/or an estimated relative position of the object based, at least in part, on the first and second pixel positions, pixel areas, and positions of the imaging module.

16. The method of claim 10, wherein the at least one horizon-stabilized image comprises a plurality of horizon-stabilized images, the method further comprising:

identifying a first plurality of pixel positions and pixel areas corresponding to a plurality of features of an object detected in a first one of the plurality of horizon-stabilized images;

identifying a second plurality of pixel positions and pixel areas corresponding to the plurality of features of the object in a second one of the plurality of horizon-stabilized images, wherein a first position of the imaging module corresponding to the first horizon-stabilized image is different from a second position of the imaging module corresponding to the second horizon-stabilized image; and generating a three dimensional point cloud model of the object based, at least in part, on the first and second pluralities of pixel positions and pixel areas and the first and second positions of the imaging module.

17. The method of claim 10, wherein the imaging module is coupled to the mobile structure by an active or passive mechanically horizon-stabilized mount, wherein the mobile structure comprises a watercraft, the method further comprising:

combining at least a portion of the navigational data with the at least one horizon-stabilized image or a synthetic viewpoint elevated image derived from the at least one horizon-stabilized image to produce a combined image; and rendering the combined image on a display of a user interface of the mobile structure, wherein the combined image comprises:

the at least one horizon-stabilized image or the synthetic viewpoint elevated image overlaid with object identification information, channel depth information, distance measurement information, object course and/or speed information, and/or other navigational information corresponding to the mobile structure or a detected object; or a navigational chart comprising navigational data derived, at least in part, from the at least one horizon-stabilized image or the synthetic viewpoint elevated image.

18. The method of claim 10, wherein the at least one horizon-stabilized image comprises a plurality of horizon-stabilized images, the method further comprising:

detecting one or more objects in the plurality of horizon-stabilized images and/or the received navigational data;

determining one or more object characteristics of each of the detected objects based, at least in part, on the plurality of horizon-stabilized images and/or the received navigational data;

segregating the detected objects into predetermined types based, at least in part, on the determined object characteristics;

identifying one or more of the objects based, at least in part, on a navigational database; and generating a synthetic Automatic Identification System (AIS) signature for at least one unidentified object, wherein the synthetic AIS signature comprises at least one object characteristic corresponding to the at least one unidentified object.

* * * * *